(12) United States Patent
Chen et al.

(10) Patent No.: US 11,616,993 B1
(45) Date of Patent: Mar. 28, 2023

(54) DYANAMIC PARAMETER ADJUSTMENT FOR ADAPTIVE BITRATE ALGORITHM

(71) Applicant: HULU, LLC, Santa Monica, CA (US)

(72) Inventors: Si Chen, Beijing (CN); Tongyu Dai, Beijing (CN); Lemei Huang, Beijing (CN); Deliang Fu, Beijing (CN); Wenhao Zhang, Beijing (CN)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 17/508,780

(22) Filed: Oct. 22, 2021

(51) Int. Cl.
*H04N 21/2343* (2011.01)
*H04N 21/234* (2011.01)

(52) U.S. Cl.
CPC ........... *H04N 21/234381* (2013.01); *H04N 21/23418* (2013.01)

(58) Field of Classification Search
CPC ............. H04N 21/8455; H04N 21/845; H04N 21/2401; H04N 21/23418; H04N 21/234381
USPC .......................................................... 725/146
See application file for complete search history.

(56) References Cited

U.S. PATENT DOCUMENTS

| | | | | |
|---|---|---|---|---|
| 8,064,389 B2* | 11/2011 | Khan | ................. | H04L 1/0045 375/240 |
| 8,072,943 B2* | 12/2011 | Khan | ................. | H04L 1/0625 370/335 |
| 8,824,304 B2* | 9/2014 | Vulkan | ................. | H04L 65/80 370/252 |
| 10,356,449 B2* | 7/2019 | Moon | ................. | H04H 60/07 |
| 10,499,278 B2* | 12/2019 | Anchan | ................. | H04L 69/24 |
| 10,567,463 B2* | 2/2020 | Ramamurthy | ... | H04N 21/23418 |
| 10,616,590 B1* | 4/2020 | Wei | ................. | H04N 19/124 |
| 10,778,991 B1* | 9/2020 | Winston | ................. | H04N 19/124 |
| 2007/0165104 A1* | 7/2007 | Khan | ................. | H04H 20/30 348/14.02 |
| 2007/0165566 A1* | 7/2007 | Khan | ................. | H04L 1/0606 370/329 |
| 2008/0170630 A1* | 7/2008 | Falik | ................. | H04N 21/6582 375/E7.193 |
| 2009/0022221 A1* | 1/2009 | Xie | ................. | H04N 19/187 375/E7.03 |
| 2009/0074082 A1* | 3/2009 | Xiong | ................. | H04N 19/61 375/E7.2 |
| 2009/0168680 A1* | 7/2009 | Singh | ................. | H04L 12/189 370/312 |
| 2009/0295905 A1* | 12/2009 | Civanlar | ................. | H04L 45/22 348/14.09 |

(Continued)

*Primary Examiner* — Michael B. Pierorazio
(74) *Attorney, Agent, or Firm* — Kwan & Olynick LLP

(57) ABSTRACT

In some embodiments, during playback of a video, using a parameter value of an adaptive bitrate algorithm to analyze playback of the video. The adaptive bitrate algorithm uses the parameter value to select a profile from a plurality of profiles to use to request segments of the video. A method selects a scenario in a plurality of scenarios when a playback condition meets a characteristic value of the scenario. The plurality of scenarios are associated with a different characteristic value. The method adjusts the parameter value of the adaptive bitrate algorithm based on the scenario to generate an adjusted parameter value. The plurality of scenarios have at least one different parameter value. The adjusted parameter value of the adaptive bitrate algorithm is used to analyze the playback of the video.

20 Claims, 15 Drawing Sheets

(56) References Cited

U.S. PATENT DOCUMENTS

| | | | |
|---|---|---|---|
| 2010/0118760 A1* | 5/2010 | Xie | H04L 65/70 370/312 |
| 2010/0172278 A1* | 7/2010 | Nishio | H04W 52/42 370/312 |
| 2010/0172286 A1* | 7/2010 | Yoshii | H04J 11/005 370/328 |
| 2012/0198501 A1* | 8/2012 | Ruan | H04H 20/30 725/62 |
| 2015/0134847 A1* | 5/2015 | Fu | H04L 47/29 709/234 |
| 2015/0365730 A1* | 12/2015 | Mohan | G11B 27/322 725/21 |
| 2017/0359607 A1* | 12/2017 | Li | H04N 21/4331 |

* cited by examiner

DYANAMIC PARAMETER ADJUSTMENT FOR ADAPTIVE BITRATE ALGORITHM

BACKGROUND

In video streaming, a profile ladder lists different profiles that are available for a client device to use when streaming segments of a video. Each profile may be associated with a different level, such as different levels of bitrate and/or quality. Accordingly, when playback conditions are good (e.g., there is high available bandwidth), the client can request a profile with a higher level (e.g., bitrate and/or quality). Conversely, when playback conditions deteriorate (e.g., there is low available bandwidth), the client device can request a profile with a lower level (e.g., bitrate and/or quality). A video delivery system would like to provide clients with a video profile that has a higher level when good playback conditions are being experienced, which improves the quality of the video being streamed. When bad playback conditions are being experienced, the video delivery system would like to provide client devices with a profile with a lower level such that the client devices can play the video without any playback issues, such as rebuffering or downloading failures.

An adaptive bitrate algorithm may analyze playback conditions to select a profile to use. The algorithm may use a fixed configuration, such as fixed parameters, in the analysis. The playback conditions that are experienced may vary greatly across different client devices. However, the parameters may be tuned for general operation for all clients. In some cases, the parameters may not be optimal when different conditions are experienced. Accordingly, there may be times when the adaptive bitrate algorithm does not operate optimally.

BRIEF DESCRIPTION OF THE DRAWINGS

With respect to the discussion to follow and to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
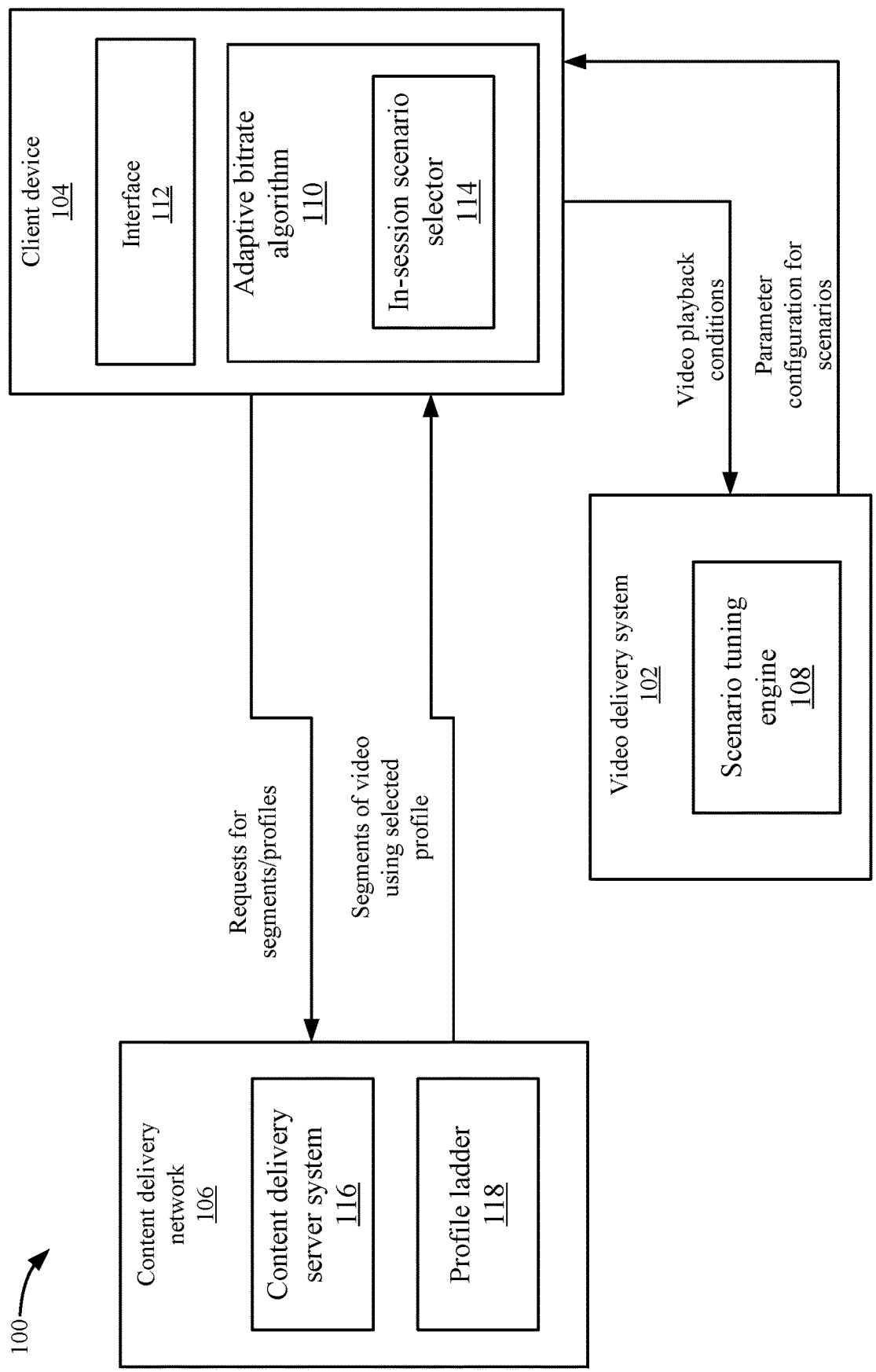
FIG. 1 depicts a simplified system for using scenarios to adjust parameters of an adaptive bitrate algorithm according to some embodiments.

Described herein are techniques for a video delivery system. In the following description, for purposes of explanation, numerous examples and specific details are set forth to provide a thorough understanding of some embodiments. Some embodiments as defined by the claims may include some or all the features in these examples alone or in combination with other features described below and may further include modifications and equivalents of the features and concepts described herein.

A video delivery system may improve the playback process by adapting parameters used in an adaptive bitrate algorithm. The playback conditions of a session may be detected in real time, and a dynamic adjustment of the parameters used by the adaptive bitrate algorithm may be performed. A playback conditions may be based on samples taken during playback, such as bandwidth, standard deviation of bandwidth, rebuffer occurrences, etc. Then, the adaptive bitrate algorithm may analyze the playback conditions using the adjusted parameters to select a profile to use to request segments of a video during playback.

A challenge in adapting the parameters is to determine how to adapt the parameters when playback conditions are changing during a playback session. In some embodiments, before a playback session starts, the video delivery system may analyze historical playback conditions to determine different scenarios that represent different sets of playback conditions that may occur. Then, the video delivery system may determine parameter settings for the different scenarios. The process of determining the playback conditions for the scenarios and the parameters will be discussed in more detail below. Once determining the scenarios and parameters for each scenario, the parameters may be adjusted in real time when a scenario is encountered during playback of a video.

A client device may detect the playback conditions that are being experienced during playback of a video. Then, the client device may determine when a change point occurs, which is a point to determine if a new scenario should be used. For example, the client device may select a scenario from a plurality of scenarios that includes playback conditions that correspond to the current playback conditions. Then, the client may adjust the parameters of the adaptive bitrate algorithm based on the parameters that were set for the scenario. Using the adjusted parameters, the adaptive bitrate algorithm may select a profile during the playback session to request segments. Using the adjusted parameters may optimize the performance of the adaptive bitrate algorithm for the playback conditions being currently experienced in the playback session. This may increase the level of the profile (e.g., bitrate and/or quality) that is used when good playback conditions are being experienced or reduce the level of the profile when poor playback conditions are being experienced. The adjusted parameters may be able to perform the switch to different profiles faster when playback conditions change because the adjusted parameters may be tuned to perform optimally (e.g., select the best profile for the playback conditions) in the presently experienced playback conditions.

System Overview

FIG. 1 depicts a simplified system 100 for using scenarios to adjust parameters of an adaptive bitrate algorithm 110 according to some embodiments. System 100 includes a video delivery system 102, a client device 104, and a content delivery network 106. Video delivery system 102, content delivery network 106, and client device 104 may be implemented using one or more computing devices. Also, although single instances of video delivery system 102, content delivery network 106, and client device 104 are shown, it will be understood that system 100 may include more than one video delivery system 102, content delivery network 106, and/or client device 104. For instance, video delivery system 102 may communicate with multiple client devices 104, and content delivery network 106 may send videos to client devices 104 via multiple servers, etc. Also, even though video delivery system 102, content delivery network 106, and client device 104 are shown as separate entities, the functions performed by them may be distributed between them or to other entities.

Video delivery system 102 may provide a video delivery service that allows client device 104 to request videos, such as videos on-demand or live videos from live television. Video delivery system 102 may provide an application to client device 104 that can display an interface 112 at client device 104. A user account may log onto the application to access the video delivery service. Then, video delivery system 102 may receive a video request from client device 104 and process the video request to allow client device 104 to stream the video.

Client device 104 may include a computing device that can playback a video in interface 112, such as via a media player (not shown). Client device 104 may include a mobile phone, smartphone, set top box, television, living room device, tablet device, etc. Client devices 104 may operate on a platform, which may be classified by a type of device that operates on the platform. For example, platforms include mobile device platforms, living room device platforms, etc. A user account that is used by a user may use client device 104 to access the video delivery service. For example, the user account may log in to the video delivery service to identify information for the user account. When client device 104 receives a request for a video from the user account, client device 104 may send the video request to video delivery system 102 for that video.

In the process to start playback of a video, video delivery system 102 may receive the request for the video from client device 104. Video delivery system 102 may select a content delivery network 106 and provide the information to content delivery network 106 and/or client device 104 to allow the video to be streamed between content delivery network 106 and client device 104. Video delivery system 102 may also provide different information, such as a playback configuration and a media presentation description. The playback configuration may include available profiles for streaming, etc. The media presentation description may include information on profiles that are available, segment duration, and other characteristics of the video.

Content delivery network 106 includes servers that can deliver a video to client device 104. For example, a content delivery server system 116 may include one or more servers that can deliver the video to client device 104. In some embodiments, content delivery server system 116 delivers segments of video to client device 104. The segments may be a portion of the video, such as six seconds of the video. A video may be encoded in multiple profiles that correspond to different levels, which may be different levels of bitrates and/or quality. The multiple profiles may be referred to as a profile ladder 118. Each video may have an associated profile ladder 118 of profiles that have different levels of bitrates and/or quality. The profiles may be classified at different levels and each level may be associated with a different characteristic. For example, each level may be associated with a different bitrate, such as 400 kilobytes per second (kbps), 650 kbps, 1000 kbps, 1500 kbps, . . . 12000 kbps. However, a level may be associated with another characteristic, such as a quality characteristic (e.g., resolution). For example, a level may be combination of bitrate and resolution. In some embodiments, the level may be determined based on how the video is encoded for the level, such as the video is encoded at the 400 kbps level for a profile associated with 400 kbps. The profile levels may be referred to as higher or lower, with profiles that have higher bitrates and/or quality being rated higher than profiles with lower bitrates and/or quality. Client device 104 may request a segment of video from one of the profile levels based on current playback conditions. The playback conditions may be any conditions that are experienced based on the playback of a video, such as available bandwidth, buffer length, etc. For example, client device 104 may use an adaptive bitrate algorithm 110 to select the profile for the video based on the current available bandwidth, buffer length, and other playback conditions.

Client device 104 may play back a video during a playback session. Adaptive bitrate algorithm 110 may analyze current playback conditions during the playback session of a video to select a profile from a profile ladder 118 that is associated with the video. Adaptive bitrate algorithm 110 may be configured with parameter values that are used by the algorithm to select a profile from profile ladder 118 based on playback conditions. Conventionally, the parameter values may have been fixed. However, adaptive bitrate algorithm 110 may dynamically adjust the parameter values using an in-session scenario selector 114. As will be discussed in more detail below, scenarios may represent different playback conditions that may be encountered. The scenarios may allow client device 104 to classify the playback conditions that are currently being experienced. When a scenario is encountered, in-session scenario selector 114 may adjust the parameter values of adaptive bitrate algorithm 110 based on the scenario. Then, adaptive bitrate algorithm 110 may select a profile to use to send requests for segments of a video being played back.

The scenarios may be configured before playback of a video. For example, a scenario tuning engine 108 may receive playback conditions for a number of sessions, such as a number of historical playback sessions. Also, the scenario tuning may be performed during the playback session using real time playback conditions and/or historical playback conditions. Scenario tuning engine 108 may then analyze the playback conditions to generate scenarios where each scenario may be associated with a different set of playback conditions. For example, if bandwidth is being used, different scenarios may be associated with different available bandwidth values and a fluctuation of bandwidth over time (e.g., a standard deviation or variance). The scenarios may be configured with one or more playback conditions, and different scenarios having at least one different value for a playback condition. For example, bandwidth may be 400 megabytes per second (mbps) and 800 mbps. Also, a different scenario may add or subtract a playback condition from another scenario. For example, a first scenario is associated with 400 mbps and a second scenario is associated with a standard deviation of 0.50 of bandwidth.

Once scenarios are determined, scenario tuning engine 108 generates parameter configurations for the scenarios. The tuning generates different parameter values depending on the playback conditions associated with a scenario. The process of generating parameter values will be described in more detail below. Once the tuning of the parameter configurations for the scenarios is performed, scenario tuning engine 108 may provide the configurations to in-session scenario selector 114. Then, in-session scenario selector 114 may use the parameter configurations to adjust the parameter values used by adaptive bitrate algorithm 110 during a playback session of a video when a scenario is encountered.

The following will now describe the tuning of the parameters for the sessions and then the dynamic adjustment of the parameters during playback.

Scenario Parameter Tuning

Figure 2:
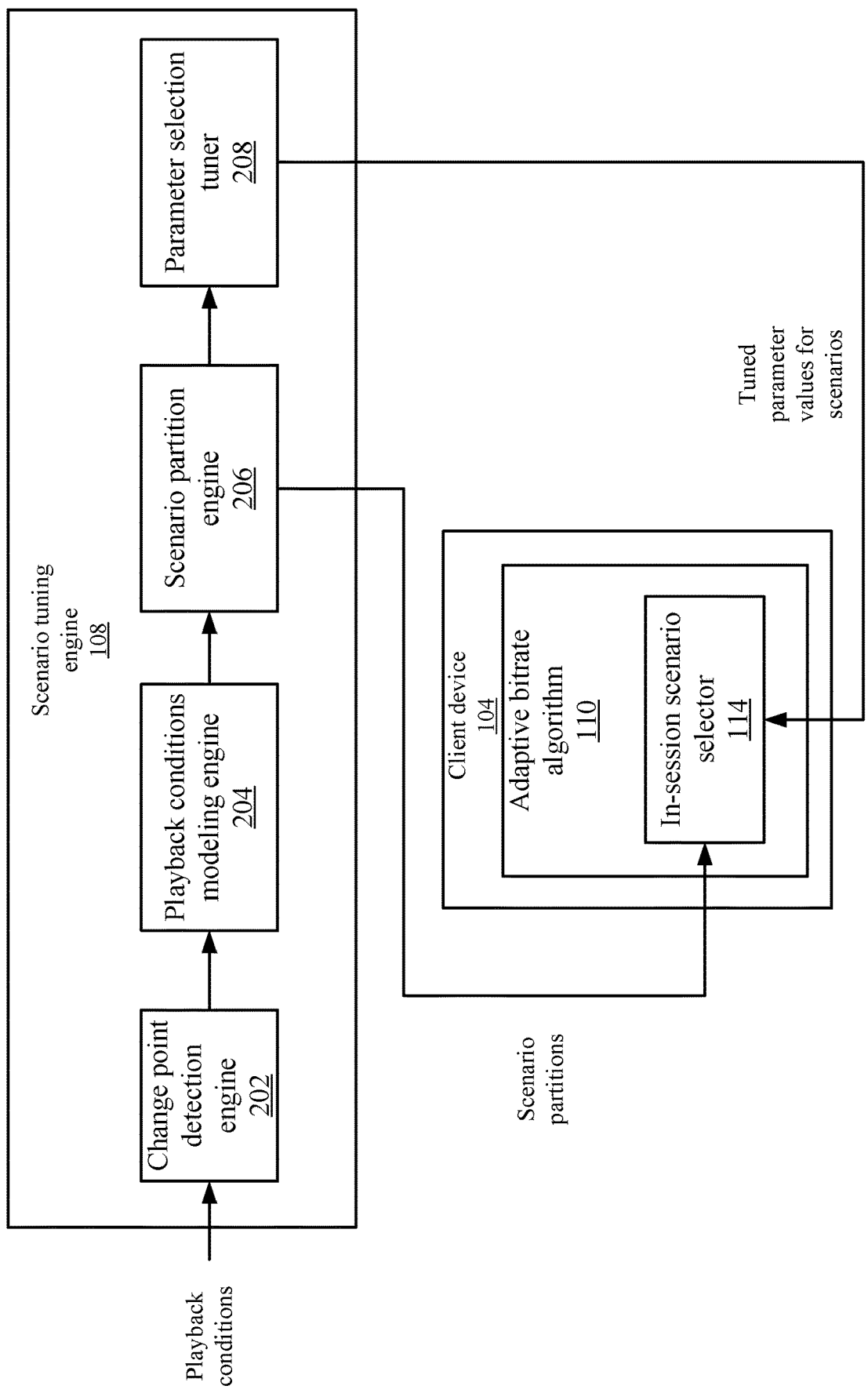
FIG. 2 depicts an example of a scenario tuning engine according to some embodiments.

As discussed above, the playback conditions associated with scenarios and the parameter values for each scenario may be determined. FIG. 2 depicts an example of scenario tuning engine 108 according to some embodiments. Scenario tuning engine 108 includes a change point detection engine 202, a playback conditions modeling engine 204, a scenario partition engine 206, and a parameter selection tuner 208.

Change point detection engine 202 receives playback conditions, which may be from historical playback sessions, real time playback sessions, and/or simulated playback conditions. Simulated playback conditions may be conditions that are manually or automatically created, historical playback conditions are from prior playback sessions that have ended, and real time playback sessions may be sessions currently playing back a video. Change point detection engine 202 may determine change points, which may be changes in the underlying model of a signal or time series that represents the playback conditions. The playback conditions may be represented as signals (e.g., network traces) from playback sessions that can represent quality-of-service (QoS) performance of the session. The playback conditions may measure different conditions that are experienced, such as bandwidth, rebuffering, etc. The bandwidth may be unstable and fluctuating, which makes determining when to adjust parameters hard in a playback session. Change points may provide defined times that may be advantageous to select a new scenario and adjust parameter values. To provide change points to adjust the parameter values, change point detection engine 202 may divide the playback conditions into different stationary windows of playback conditions that can be used to determine when to adjust parameter values.

Figure 3A:
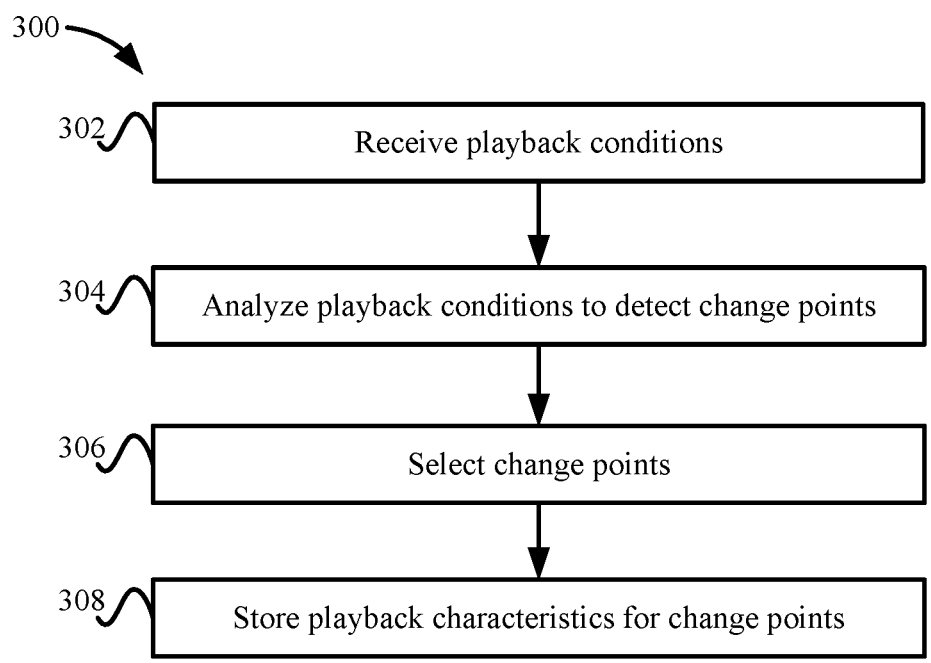
FIG. 3A depicts a simplified flowchart of a method for performing change point detection according to some embodiments.

Change point detection engine 202 may use the following process to determine change points, but other processes may be used. FIG. 3A depicts a simplified flowchart 300 of a method for performing change point detection according to some embodiments. At 302, change point detection engine 202 receives playback conditions. The playback conditions may be represented by a signal or time series, which may be measurements from one or more playback sessions.

At 304, change point detection engine 202 analyzes the playback conditions to detect change points. The analysis may measure changes in the signal and when the changes meet a threshold, change point detection engine 202 may determine a change point occurs. The changes in the signal may represent a time in which the parameter values of adaptive bitrate algorithm 110 may be adjusted.

Figure 3B:
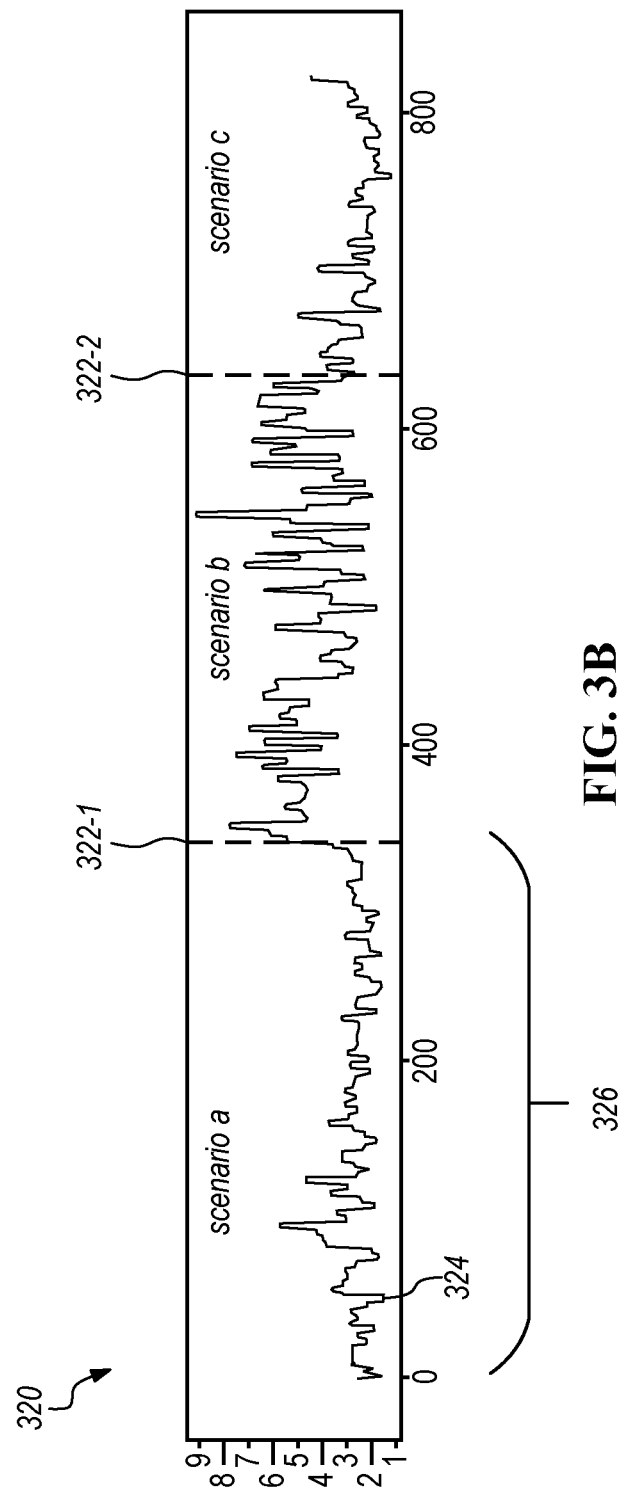
FIG. 3B depicts an example of a signal that is being analyzed from the playback conditions according to some embodiments.

FIG. 3B depicts an example of a signal that is being analyzed from the playback conditions according to some embodiments. The X axis may be a time during playback of a video and the Y axis may be the bandwidth (mbps). A signal is shown at 324, which may be a representation of samples of the playback conditions that are received, such as a mean of bandwidth samples. To analyze the signal, different methods may be used to determine when a change point occurs. For example, for a discrete signal that includes multiple samples $y_0, y_1, \ldots, y_{T-1}$ (T samples), change point detection engine 202 may determine the sum of squared errors over all possible change point positions, such as at times, $t_1, t_2, \ldots, t_K$. In some embodiments, change points may be determined by selecting points that meet a threshold, such as change points that can minimize the sum of squared errors for the signal. The sum of squared errors may fit a line between sample points, and then a sliding window is used to compare the sample points in the window to find out the best fit through error reduction. The errors may be the sum of differences between the actual value and the predicted value. Minimizing the sum of squared errors finds points that minimizes the sum of squared errors for a portion of the signal. For a discrete signal $y_0, y_1, \ldots, y_{T-1}$ (T samples), change point detection engine 202 may solve the following optimization problem over all possible change point positions $t_1, t_2, \ldots, t_k$:

$$\hat{t}_1, \hat{t}_2, \ldots, \hat{t}_K = \arg\min_{t_1 \ldots t_K} V(t_1, t_2, \ldots, t_K) \text{ with}$$

$$V(t_1, t_2, \ldots, t_K) := \sum_{k=0}^{K} \sum_{t=t_k}^{t_{k+1}-1} \|y_t - \bar{y}_{t_k \ldots t_{k+1}}\|^2$$

Figure 3C:
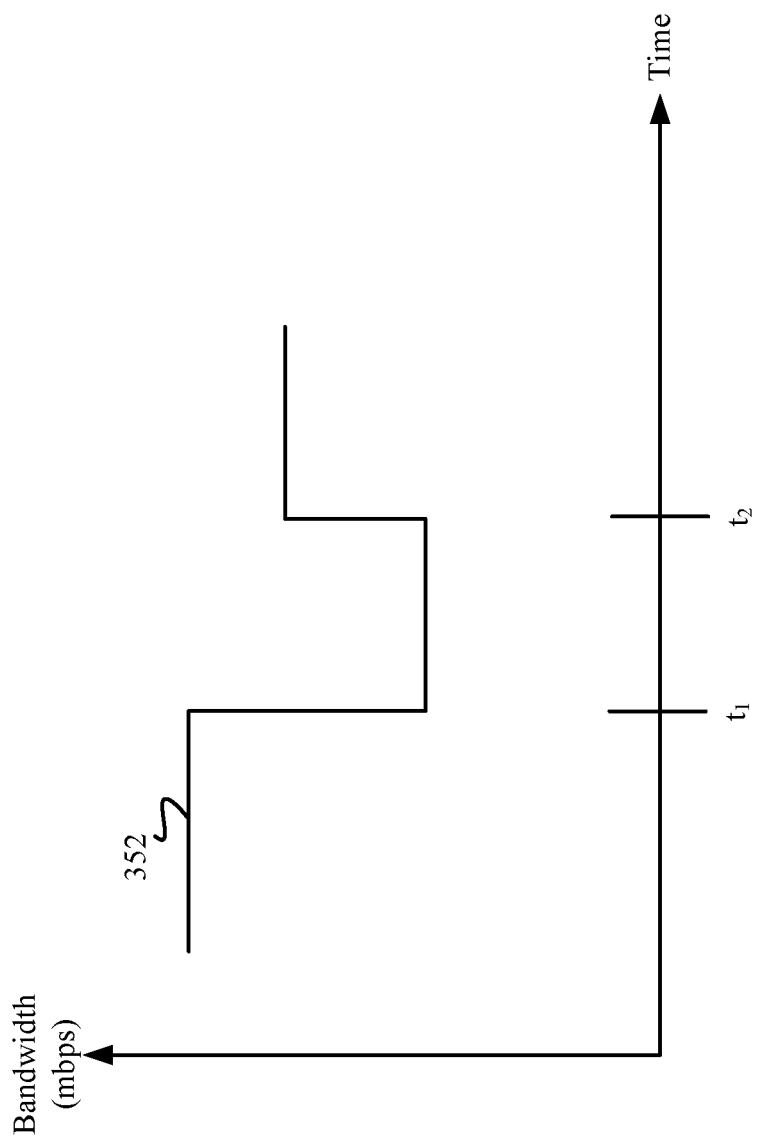
FIG. 3C depicts a simplified graph of a signal and change points according to some embodiments.

For a signal, $y_0, y_1, \ldots, y_{T-1}$ (T samples), each sample may be taken as a change point. Also, the change points can be defined as $t_1, t_2, \ldots, t_K$ by controlling the distance between change points. Note that: $t_1 < t_2 < \ldots < t_K$, $t_0 = 0$, $t_{k+1} = T$. The summation $$\sum_{t=t_k}^{t_{k+1}-1} \|y_t - \bar{y}_{t_k \ldots t_{k+1}}\|^2$$

represents the squared error of bandwidth samples between two adjacent change points, reflecting the fluctuation of bandwidth during this period. Also, the summation $$\sum_{k=0}^{K} \sum_{t=t_k}^{t_{k+1}-1} \|y_t - \bar{y}_{t_k \cdots t_{k+1}}\|^2$$

represents the sum of squared errors between a window of change points or all the change points. FIG. 3C depicts a simplified graph 350 of a signal 352 and change points according to some embodiments. If change points are selected at times $t_1$ and $t_2$, the summations equal zero, that is, $$\sum_{t=t_0}^{t_1-1} \|y_t - \bar{y}_{t_k \cdots t_{k+1}}\|^2 = 0, \sum_{t=t_1}^{t_2-1} \|y_t - \bar{y}_{t_k \cdots t_{k+1}}\|^2 = 0 \ldots , \text{ so}$$

$$\sum_{k=0}^{K} \sum_{t=t_k}^{t_{k+1}-1} \|y_t - \bar{y}_{t_k \cdots t_{k+1}}\|^2 = 0.$$

The sum of squared errors are zero for each portion of the signal between the change points because the fluctuation in bandwidth in the signal between change points is zero. If times $t_1$ and $t_2$ are not selected as change points, the sum of squared errors must be greater than 0 because there will be fluctuation in bandwidth in the portions of the signal between the change points.

In FIG. 3B, change point detection engine 202 determines change points at 322-1 and 322-2. The change points are determined based on a change in playback conditions in signal 324 that meet a threshold. For example, by selecting a change point at 322-1, a first portion of the signal at 326 may have the sum of squared errors that meets the threshold (e.g., less than a value or zero). This is because including values of the signal after the change point at 322-1 may increase the error due to the values being further away from the values of the signal found in the first portion at 326. The other change point at 322-2 may be determined similarly.

Referring back to FIG. 3A, at 306, change point detection engine 202 selects the change points as described above. Then, after determining change points 322-1 and 322-2, at 308, change point detection engine 202 may store playback characteristics for the change points. For example, using change points 322-1 and 322-2, change point detection engine 202 may calculate the average bandwidth, standard deviation of bandwidth between change points 322-1 and 322-2, and number of rebuffers. Using the metrics of average bandwidth, standard deviation of bandwidth, and rebuffers, change point detection engine 202 can map the current network conditions to a specific scenario according to any scenario partition rule as will be discussed below. These playback characteristics may be used by client device 104 during playback of a video to determine when to perform the adjustment of the parameters for adaptive bitrate algorithm 110. One reason why change points are used is that the playback conditions of a playback session may be unstable and vary. By using change points, client device 104 may determine distinct times when the change in parameter values may be performed to improve the playback. This provides static conditions that can be met to determine when to perform the analysis. Using change points may also minimize the number of times parameters are adjusted. There may be a cost to change parameter values during a playback session, such as changing parameter values may use computing resources. Also, changing the parameter values may cause adaptive bitrate algorithm 110 to operate differently, which may not be desirable if the playback conditions have not changed significantly. It may be undesirable to continually change the parameter values when playback conditions have not changed significantly.

The change points determine when to perform an analysis to possibly change scenarios, but does not determine a scenario. However, after determining a change point, a scenario is selected. To select a scenario, the current playback conditions of the playback session may be compared to playback conditions that are associated with scenarios. These playback conditions for scenarios also are determined. Referring back to FIG. 2, after determining the change points, a playback conditions modeling engine 204 may model the playback conditions for each scenario. The modeling of the playback conditions may define playback conditions that may be associated with each scenario such that client 104 can select one of the scenarios during playback. Also, the modeling of the playback conditions may allow scenario tuning engine 108 to tune the parameter values for each scenario, which will be discussed below.

Figure 4:
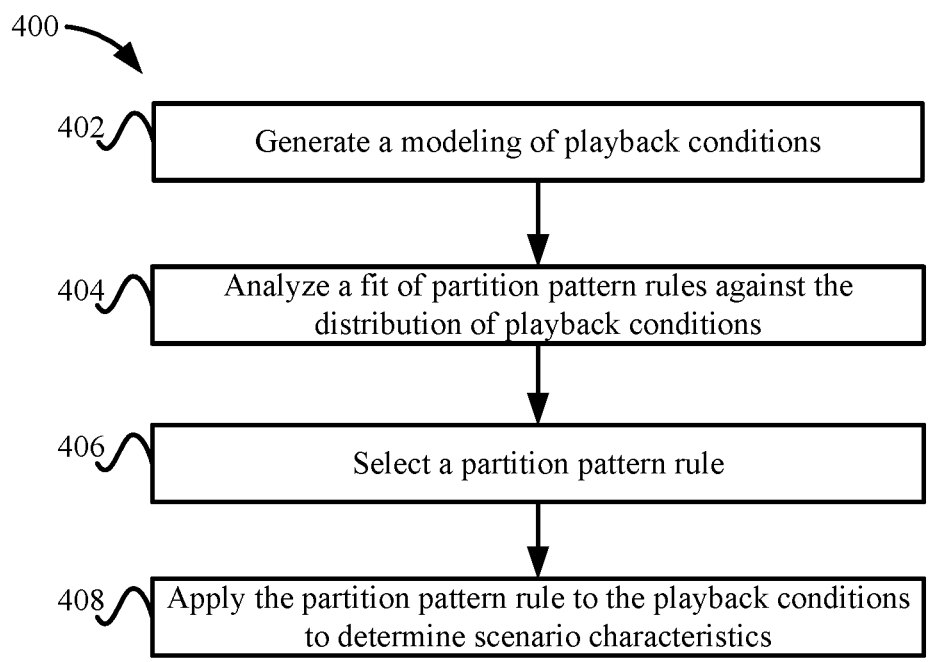
FIG. 4 depicts a simplified flowchart for determining playback conditions for scenarios according to some embodiments.

FIG. 4 depicts a simplified flowchart 400 for determining playback conditions for scenarios according to some embodiments. At 402, playback conditions modeling engine 204 generates a representation of the playback conditions. The representation may be a distribution of the playback conditions, such as a distribution of bandwidth, bandwidth fluctuation, and rebuffer occurrences. Although these playback conditions are described, distributions of other playback conditions may be appreciated.

At 404, playback conditions modeling engine 204 analyzes a fit of partition pattern rules against the distribution of playback conditions. A partition pattern rule may partition areas of the distribution into multiple scenarios. Also, different partition pattern rules may partition a distribution differently. For example, different patterns, such as grids, may be used, but other patterns may be used, such as free-form drawn patterns, circular patterns, any other shape of patterns, and a combination of patterns.

At 406, playback conditions modeling engine 204 selects a partition pattern rule. The partition pattern rule may be selected based on the characteristics of the distribution. The following will now describe one method of selecting the partition pattern rule.

Figure 5:
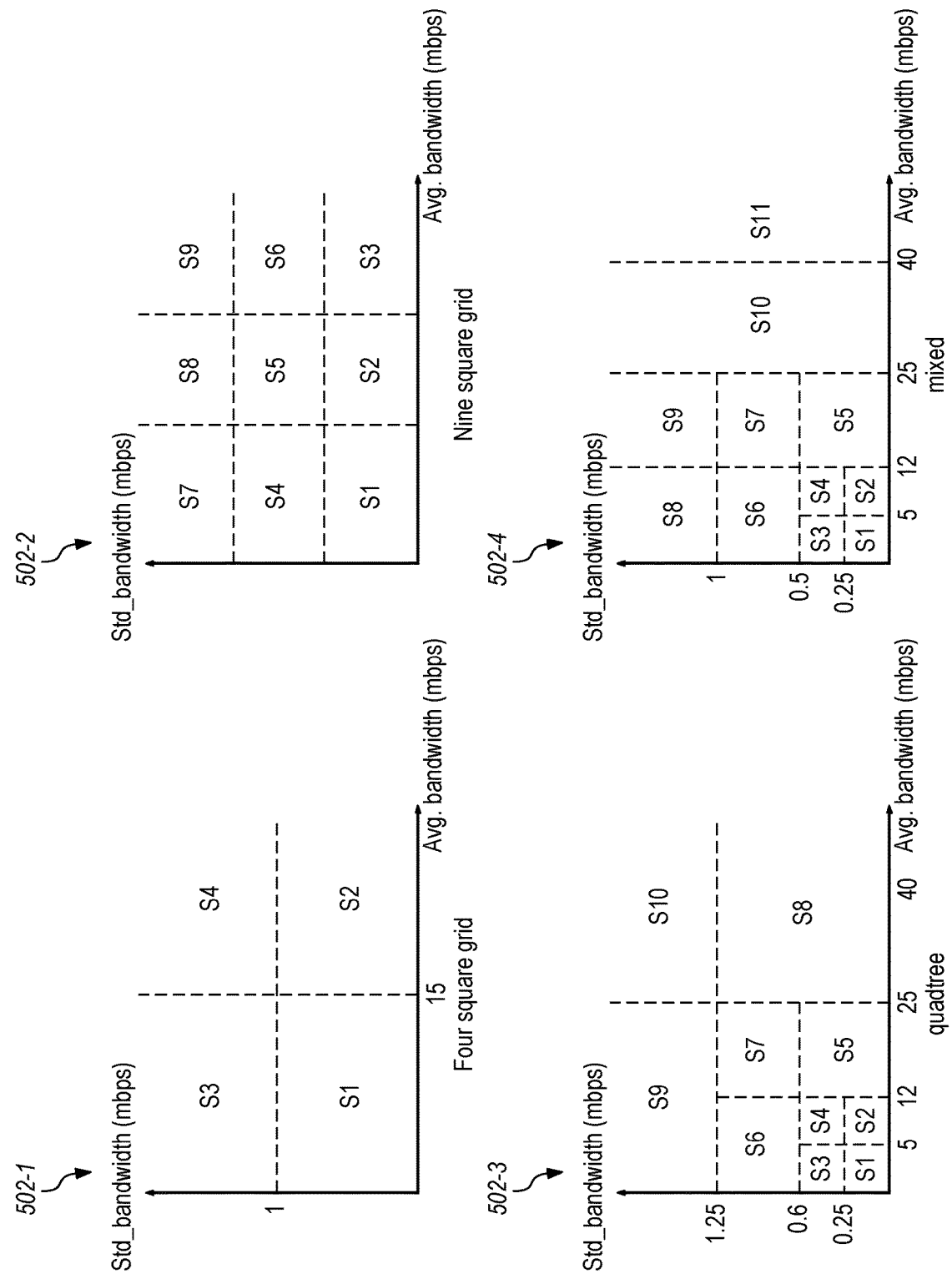
FIG. 5 depicts an example of different playback partition rules that may be used according to some embodiments.

FIG. 5 depicts an example of different playback partition rules that may be used according to some embodiments. The partitioning patterns of each rule may divide a distribution into different sized partitions based on a characteristic, such as the density of data points. The partitions may be determined in different ways, such as by a clustering algorithm that generates clusters from the data points. The clusters may be determined based on similar characteristics of data points in the clusters. Different clustering algorithms may be used to determine the clusters. The partition pattern that is used may be based on the clusters that are determined. A partition pattern 502-1 may be a four-square grid that divides distribution into four partitions and a partition pattern 502-2 may divide distribution into nine partitions in a nine-square grid. A partition pattern 502-3 may use a quad-tree partitioning, where each partition may be further partitioned using the quad-tree partition. For example, a partition may continually be divided by four additional partitions. A partitioning pattern 502-4 may use different types of partition patterns. For example, partitions S10 and S11 use a rectangular partition pattern and the partitions S1 to S9 use a quadtree partition pattern. Although the above partition patterns are used, different partition patterns may be appreciated.

Figure 6A:
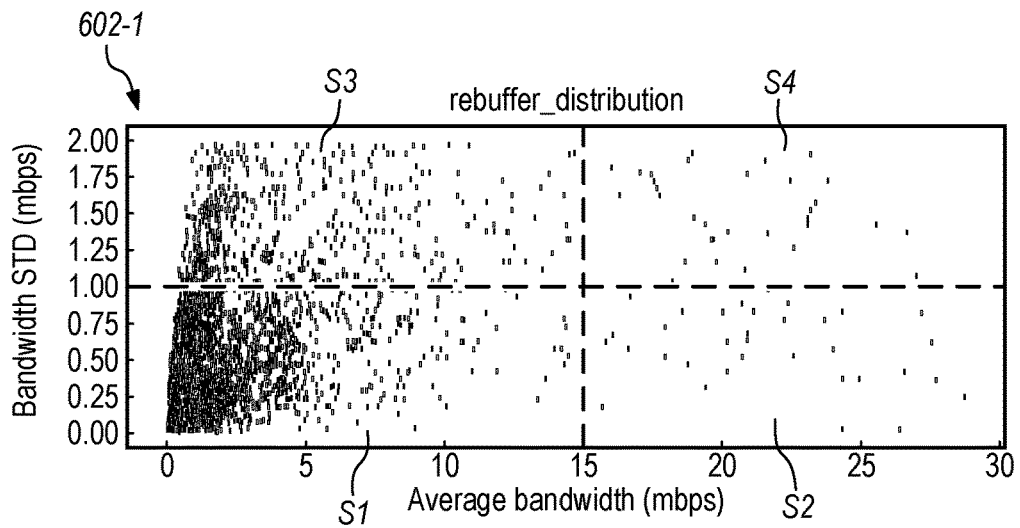
FIGS. 6A to 6C depict the application of different partition patterns to a distribution according to some embodiments.
Figure 6B:
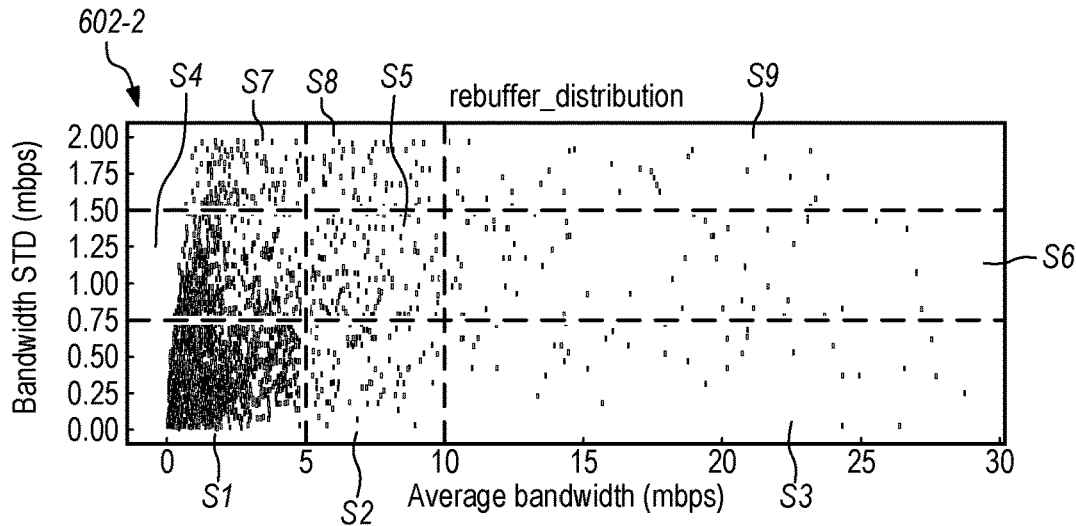
Figure 6C:
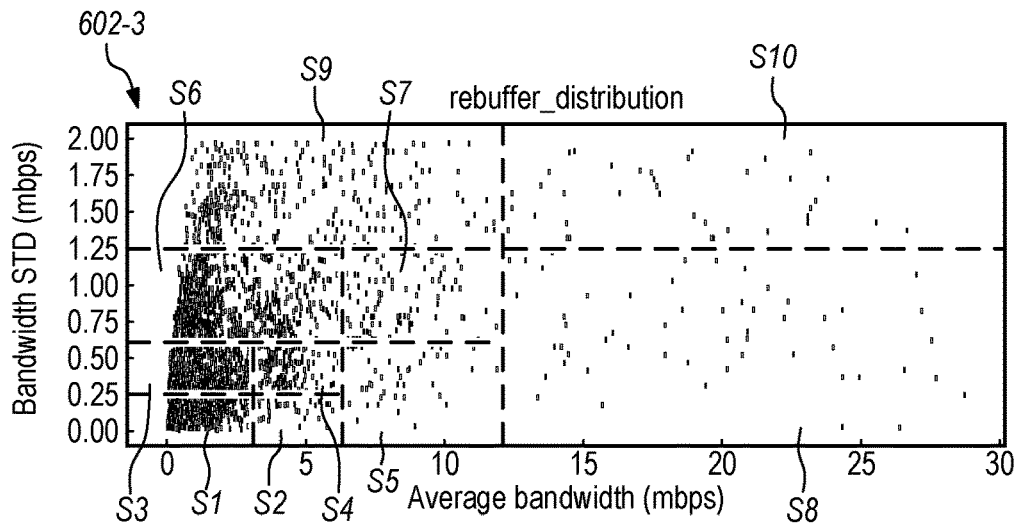

The patterns may be selected based on the playback conditions that are used. FIGS. 6A to 6C depict the application of different partition patterns to a distribution according to some embodiments. The distribution may map rebuffer occurrences to the average bandwidth and bandwidth standard deviation in which the rebuffer occurrence occurred. In FIG. 6A, a graph 602-1 shows a distribution with a four-square partition pattern. The partitions S1 and S3 may include a large amount of data points from the distribution. However, partitions S2 and S4 may include a very small amount of data points. It is possible that using the large partitions of S1 and S3 may not be ideal for the large number of data points in those partitions. Also, the small amount of data points in partitions S2 and S4 may not be ideal due to the lack of data that can be used to determine the playback conditions for those partitions.

In FIG. 6B, a graph 602-2 shows a nine partition grid that is used according to some embodiments. As mentioned above, partitions S2 and S4 in FIG. 6A may have had a very small amount of data points. In the distribution, there may be more data points with a lower bandwidth. To increase the number of data points in a partition, partitions S3, S6, and S9 may have a larger area horizontally than partitions S2 and S4 in FIG. 6A to capture more data points that have a lower bandwidth. Now, a larger number of data points are included in these partitions, which may be used to better characterize the playback conditions in each respective partition. Also, partitions S1, S2, S4, S5, S7, and S8 in FIG. 6B are smaller than partitions S1 and S3 in FIG. 6A. This allows the smaller partitions to represent the data points with more granularity.

There still may be a large amount of data points in the lower left corner of the distribution in partition S1 and a smaller amount in partitions S7 and S8. FIG. 6C shows a graph 602-3 that may also be used to partition the distribution according to some embodiments. In some examples, there may be a large amount of data points that have an average bandwidth of less than five megabytes per second (mbps) and a standard deviation under 0.50. In this case, a quad-tree partition pattern may be used for partitions S1, S2, S3, and S4, which was formerly partition S1 in FIG. 6B. Partitions S8 and S10 are relatively large due to the small amount of data points found in those areas and replace the three partitions of S3, S6, and S9 in FIG. 6B. Also, a partition S9 may replace partitions S7 and S8 in FIG. 6B due to the smaller amount of data points in that area. Additionally, partitions S5, S6, and S7 may be larger than partitions S1 to S4 due to the smaller amounts of data points within those partitions.

Accordingly, the partition pattern rule divides the distribution based on the characteristics of data points that are found in the distribution. Each partition in the pattern may represent different playback conditions. For example, in FIG. 6A, partition S1 represents a low bandwidth, low fluctuation, and high rebuffer area. This is a high rebuffer area because a large amount of rebuffers were experienced. Also, this is a low fluctuation area due to a low standard deviation among the bandwidth in which rebuffers occurred (e.g., the number of rebuffers occurred at around the same average bandwidth). Partition S2 represents a high bandwidth, low fluctuation, and low rebuffer area. This partition has a higher average bandwidth than partitions S1 and S3, a lower standard deviation from the average bandwidth than partitions S3 and S4, and a smaller amount of rebuffer occurrences than partitions S1 and S3. Partition S3 represents a low bandwidth, high fluctuation, and high rebuffer area. The standard deviation is higher than partition S1 representing higher fluctuation, the average bandwidth is lower than partitions S2 and S4, and there is a large amount of rebuffer occurrences in partition S3 compared to partitions S2 and S4. Partition S4 represents a high bandwidth, high fluctuation, and lower rebuffer area. Partition S4 has a higher than average bandwidth than partitions S1 and S3, a higher bandwidth standard deviation than partitions S1 and S2, and a smaller amount of rebuffer occurrences than partitions S1 and S3. The other partitions in FIGS. 6B and 6C may be characterized using the same analysis looking at the number of data points within a partition, the average bandwidth, and bandwidth standard deviation. Referring back to FIG. 4, at 408, playback conditions modeling engine 204 applies the partitioning pattern rule to the playback conditions to determine scenario characteristics.

Then, referring back to FIG. 2, scenario partition engine 206 may output the characteristics for the scenarios. For example, depending on which partitioning rule was selected, scenarios may have the characteristics that were described above with respect to FIGS. 6A to 6C. Scenario partition engine 206 may send the characteristics to determine scenarios based on the partitioning patterns to in-session scenario selector 114. Using the scenario characteristics, in-session scenario selector 114 can select a scenario based on the real time playback conditions of a playback session that are encountered.

Parameter selection tuner 208 may select parameter values to use for each scenario when selecting profiles for adaptive bitrate algorithm 110. Some parameters may include a bandwidth safe factor, a low buffer watermark, a simulation duration, a rebuffer penalty, a switch penalty, and so on. However, different adaptive bitrate algorithms 110 may use different parameters to select a profile. The bandwidth safe factor may be used to prevent bandwidth overestimation and future bandwidth degradation. For example, adaptive bandwidth algorithm 110 may use estimated bandwidth of a current playback session to determine the profile to select. The bandwidth may be calculated based on the previous downloaded segment and equals the segment size divided by the download time. Sometimes, that value may not be directly used, but may be multiplied by the bandwidth safe factor. This will change the estimated bandwidth that is used to select the profile. The value of the bandwidth safe factor may be changed to be more aggressive or less aggressive. For example, a lower bandwidth safe factor may cause adaptive bandwidth algorithm 110 to be more conservative when switching profiles while a higher bandwidth safe factor may cause adaptive bandwidth algorithm 110 to be more aggressive. The rebuffer penalty and switch penalty may be parameters in a reward formula that is used to select the profile. For example, a reward for switching to a new profile may be calculated and a profile with the highest reward may be selected. One example of a reward may be calculated using: Reward=bitrate−rebufferPenalty*totalRebufferTime−switchPenalty|current bitrate−previous bitrate|. The rebuffer penalty, rebufferPenalty, and switch penalty, switchPenalty, may be parameters in this formula. The parameter of simulation duration may be used when a download process is simulated for the next N segments in adaptive bitrate algorithm 110. The value of N may be determined by the parameter of simulation duration, where N=simulation duration/segment duration. For each profile, adaptive bitrate algorithm 110 simulates a download process for these N segments using the estimated bandwidth and if a rebuffer occurs, adaptive bitrate algorithm 110 records the total rebuffer time. After simulation, adaptive bitrate algorithm 110 may calculate the reward for each alternative profile and select the profile corresponding to the highest reward. The low buffer watermark parameter may be used to determine when a rebuffer occurs as a rebuffer may occur when the data within the buffer falls below a certain point determined by the low buffer watermark parameter. Although the above parameters are discussed, other parameters may be appreciated.

Figure 7A:
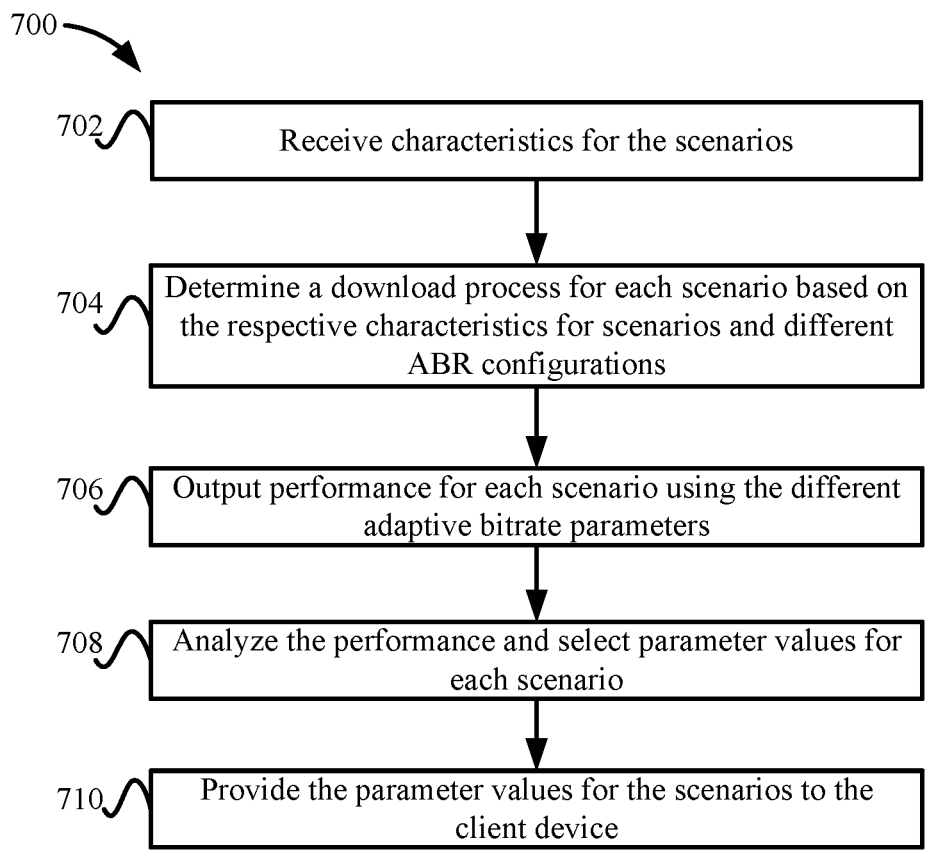
FIG. 7A depicts a simplified flowchart of a method for tuning parameters for each scenario according to some embodiments.

Parameter selection tuner 208 may use the playback conditions for each scenario to generate optimal parameters for each respective scenario. FIG. 7A depicts a simplified flowchart 700 of a method for tuning parameters for each scenario according to some embodiments. At 702, parameter selection tuner 208 receives the characteristics for the scenarios. The characteristics may be the average bandwidth, the standard deviation of the bandwidth, and rebuffer occurrences. Then, at 704, parameter selection tuner 208 determines a download process for each scenario based on the respective characteristics for the scenarios and different adaptive bitrate parameter configurations. For example, parameter selection tuner 208 may determine network traces that have the characteristics of each scenario. For each scenario, the playback is simulated to represent the streaming of the video to client device 104 using different parameter values, and parameter selection tuner 208 may record the performance of the playback using different parameter values. For example, playback conditions, such as quality-of-service performance, may be recorded. In one example, the performance may be quantified by a rebuffer ratio. The following will describe the parameter tuning using rebuffer ratios for each scenario.

Figure 7B:
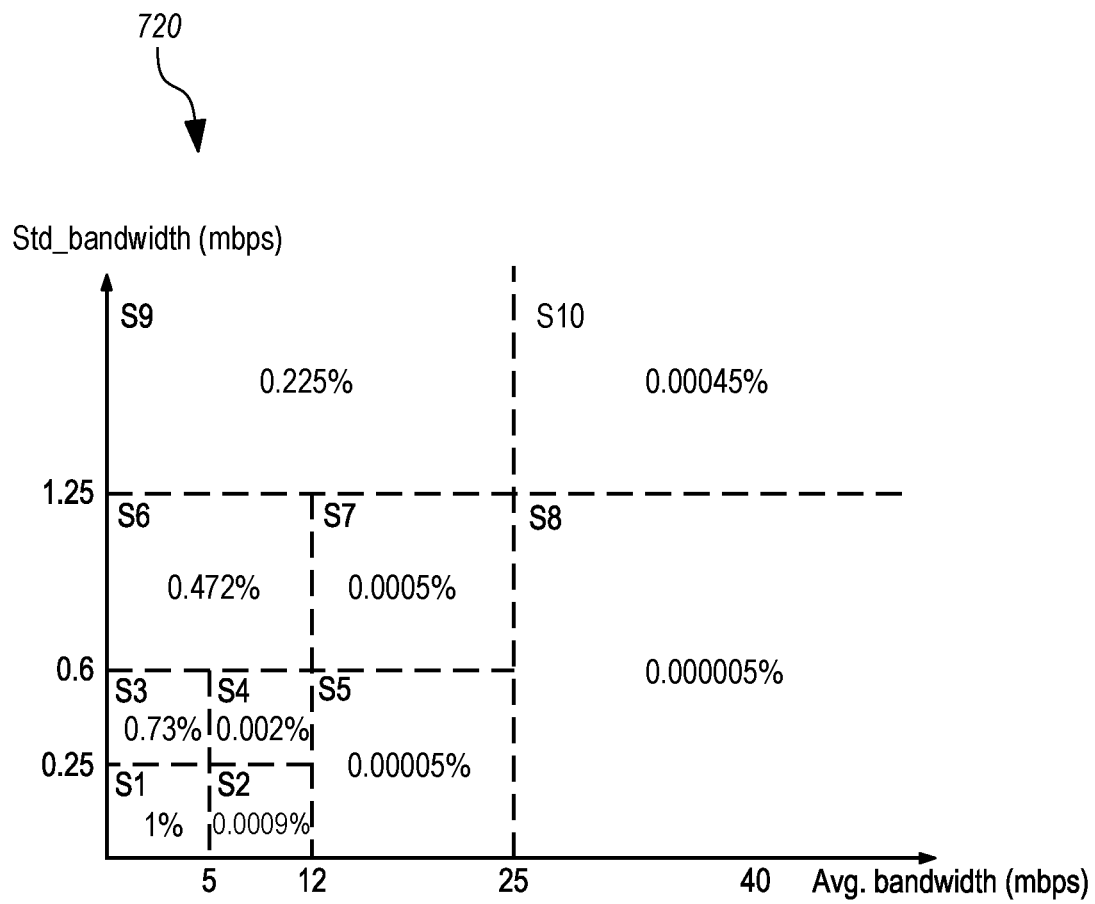
FIG. 7B depicts a graph of rebuffer ratios for each scenario according to some embodiments.

At 706, parameter selection tuner 208 outputs the performance for each scenario using the different adaptive bitrate parameters. Then, at 708, parameter selection tuner 208 analyzes the performance and selects parameters for each scenario. FIG. 7B depicts a graph 720 of rebuffer ratios for each scenario according to some embodiments. As discussed above, the distribution in FIGS. 6A to 6C may have represented the density of rebuffer occurrences. FIG. 7B may quantify the rebuffer occurrences as a value that reflects the rebuffer performance in each area based on the performance of the network traces for each scenario. That is, for each scenario, the network traces that represent the scenario are played back. Then, the value shown in each scenario in graph 720 may represent the performance for each scenario. As shown, each partition S1 to S10 includes a rebuffer ratio value. A lower value may represent a lower number of rebuffers for the network traces. A higher number may represent a higher number of rebuffers occurred for the network traces. When a scenario includes a higher rebuffer ratio, adaptive bitrate algorithm 110 should be more conservative during these scenarios to reduce the rebuffer occurrences. However, for scenarios where the rebuffer ratio is lower, adaptive bitrate algorithm 110 may be more aggressive to increase the profile that is used due to the lower chance of rebuffer occurring. In this case, partitions S1 (1% rebuffer ratio), S3 (0.73%), S6 (0.472%), and S9 (0.225%) may have higher rebuffer ratios compared to other scenarios, and the parameters for these partitions may be set more conservatively. However, partitions S2 (0.0009%), S4 (0.002%), S5 (0.00005%), S7 (0.0005%), S8 0.000005%), and S10 (0.00045%) may have lower rebuffer ratios, and the parameters for these scenarios may be set to be more aggressive.

The process to determine the exact parameter values for scenarios may be different. For example, each network trace may be simulated with different parameters for adaptive bitrate algorithm 110. The performance for each network trace may be analyzed. Parameter selection tuner 208 may select the parameter values that correspond to the optimal performance for a network trace in each scenario. In other examples, different rebuffer ratios may be mapped to different parameter values. Also, a prediction network may be used to output the parameters based on the playback conditions and rebuffer ratio for each scenario. In some examples, the standard value for a bandwidth safe factor may be 0.65. When adaptive bitrate algorithm 110 should be conservative, the bandwidth safe factor may be lowered to a range between 0 to 0.65, and when adaptive bitrate algorithm 110 should be more aggressive, the bandwidth safe factor may be increased to a range between 0.65 and 1.

Referring back to FIG. 7A, at 710, parameter selection tuner 208 provides the parameter values for the scenarios to client device 104. For example, referring to FIG. 2, parameter selection tuner 208 sends the parameter values for the scenarios to in-session scenario selector 114. After selecting the parameter values for each scenario, the in-session selection of scenarios to adjust parameter values may be performed.

In-Session Parameter Adjustment

Figure 8:
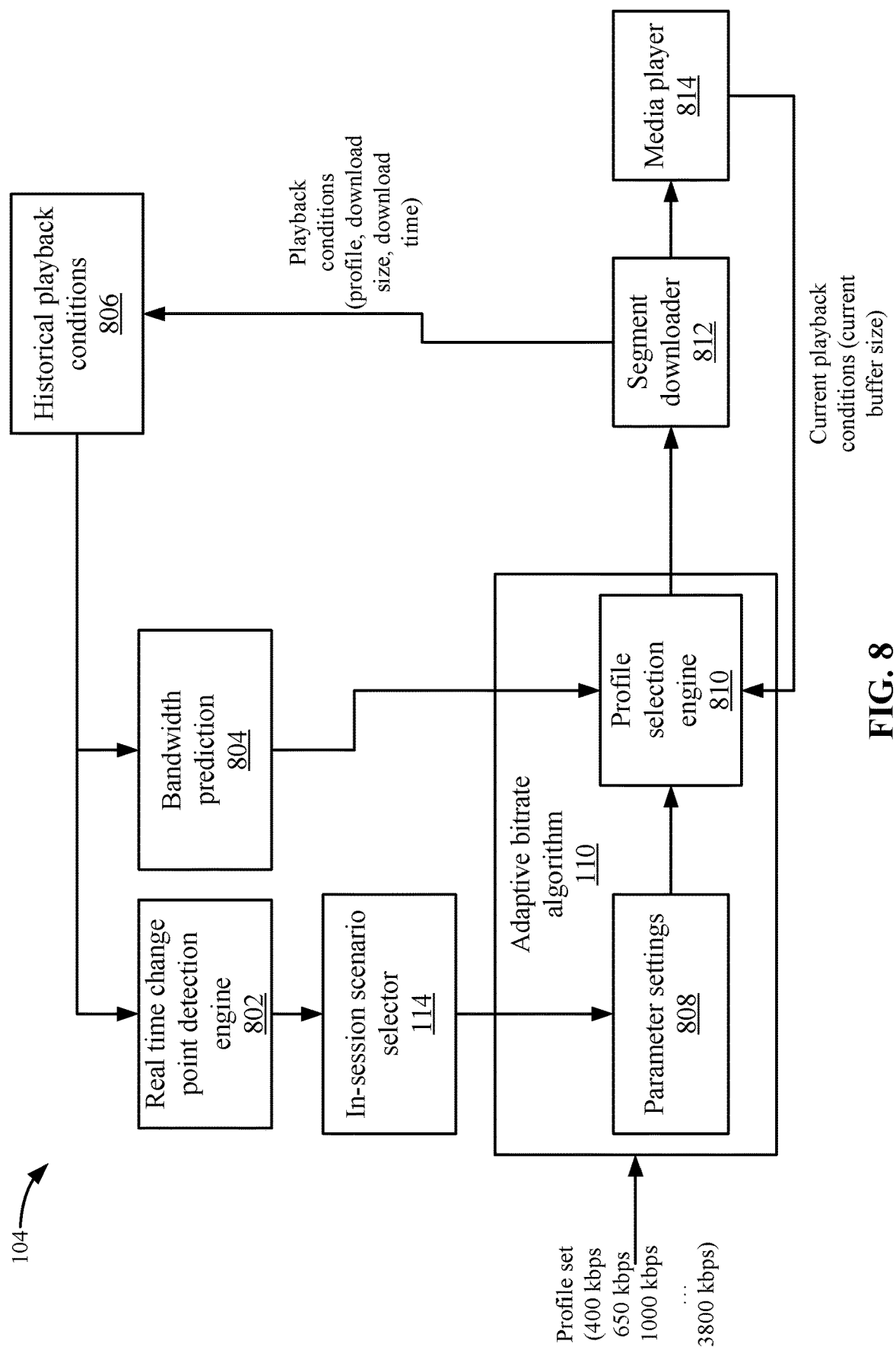
FIG. 8 depicts a more detailed example of a client device according to some embodiments.

FIG. 8 depicts a more detailed example of client device 104 according to some embodiments. During a playback session, in-session scenario selector 114 may select a scenario and adjust the parameters of adaptive bitrate algorithm 110. A real time change point detection engine 802 may determine when a change point is reached in the playback session of video that is currently being played. For example, as segments are downloaded by a segment downloader 810 while playing back the video, the playback conditions, such as the profile used, download size, and download time, may be stored in historical playback conditions 806. The current playback conditions may be included with playback conditions for previously downloaded segments to form historical playback conditions. Real time change point detection engine 802 may receive the historical playback conditions and detect when change point occurs based on the characteristics defined by the change points that were previously determined. For example, real time change point detection engine 802 can use a sliding window, such as covering the bandwidth data of the past 100 seconds. When a new bandwidth sample is received, real time change point detection engine 802 moves the sliding window to remove the oldest sample and to include the newest sample. Then, real time change point detection engine 802 may use the same method as described in FIG. 3A to detect whether there is a change point in the sliding window. If a change point is not determined, real time change point detection engine 802 keeps using the current parameters. If a change point is determined, real time change point detection engine 802 calculates the playback characteristics, such as average bandwidth and standard of deviation, from the bandwidth samples between the last two change points. The playback characteristics may then be used to select a scenario.

In-session scenario selector 114 may select a scenario when a change point has occurred. Although the scenario selection is discussed as occurring when a change point occurs, in-session scenario selector 114 may perform the process described at other times, such as continuously, at certain time periods (e.g., every 30 seconds or minute, etc.), or at other times. However, as discussed above, using the change point detection may be useful to minimize the resources that are being used to change the scenarios.

In-session scenario selector 114 may select a scenario and provide the parameters for the scenario to adaptive bitrate algorithm 110. Adaptive bitrate algorithm 110 may then adjust the parameters in parameter settings 808. A profile selection engine 810 may receive a profile ladder 118 that defines the profiles that can be selected for the session. For example, profile ladder 118 may include different profiles that have different bitrates and/or qualities (e.g., resolutions). For discussion purposes, only bitrates may be discussed. In some embodiments, the bitrates may include 400 mbps, 650 mbps, 1000 mbps, . . . , 3800 mbps, etc. The different levels of profiles may indicate a different level of quality, such as a higher bitrate may be associated with a higher quality.

Profile selection engine 810 may select a profile based on playback conditions, such as a bandwidth prediction 804 and buffer size. For example, bandwidth prediction 804 may predict the bandwidth for the next N segments using historical playback conditions 806. Profile selection 810 may execute an algorithm that may use the parameters to select a profile. As discussed above, the parameters of playback safe factor, rebuffer penalty, switch penalty, etc. may be adjusted based on the scenario that is selected. However, different parameters that are used by the algorithm may be adjusted based on the scenario that is selected. Then, adaptive bitrate algorithm 110 executes the algorithm using the adjusted parameters to select a profile based on current playback conditions, such as the bandwidth and buffer size.

Once the profile is selected using the adjusted parameters, segment downloader 810 may download a segment for the profile. It is noted that adjusting the parameters may or may not result in selecting a new profile. It is possible that the playback conditions may not warrant a profile change even with the adjusted parameters. However, as playback conditions change, the adjusted parameter values may result in a profile change that is different compared to if the previous parameter values were used.

After requesting the segment, media player 814 may receive the segment and play back the segment. After playing the segment, segment downloader 810 may provide the profile that is used, the download size, and the download time to add to historical playback conditions 806. Also, media player 814 may provide a current buffer size to profile selection engine 810. The process then continues to determine when to switch profiles.

Figure 9:
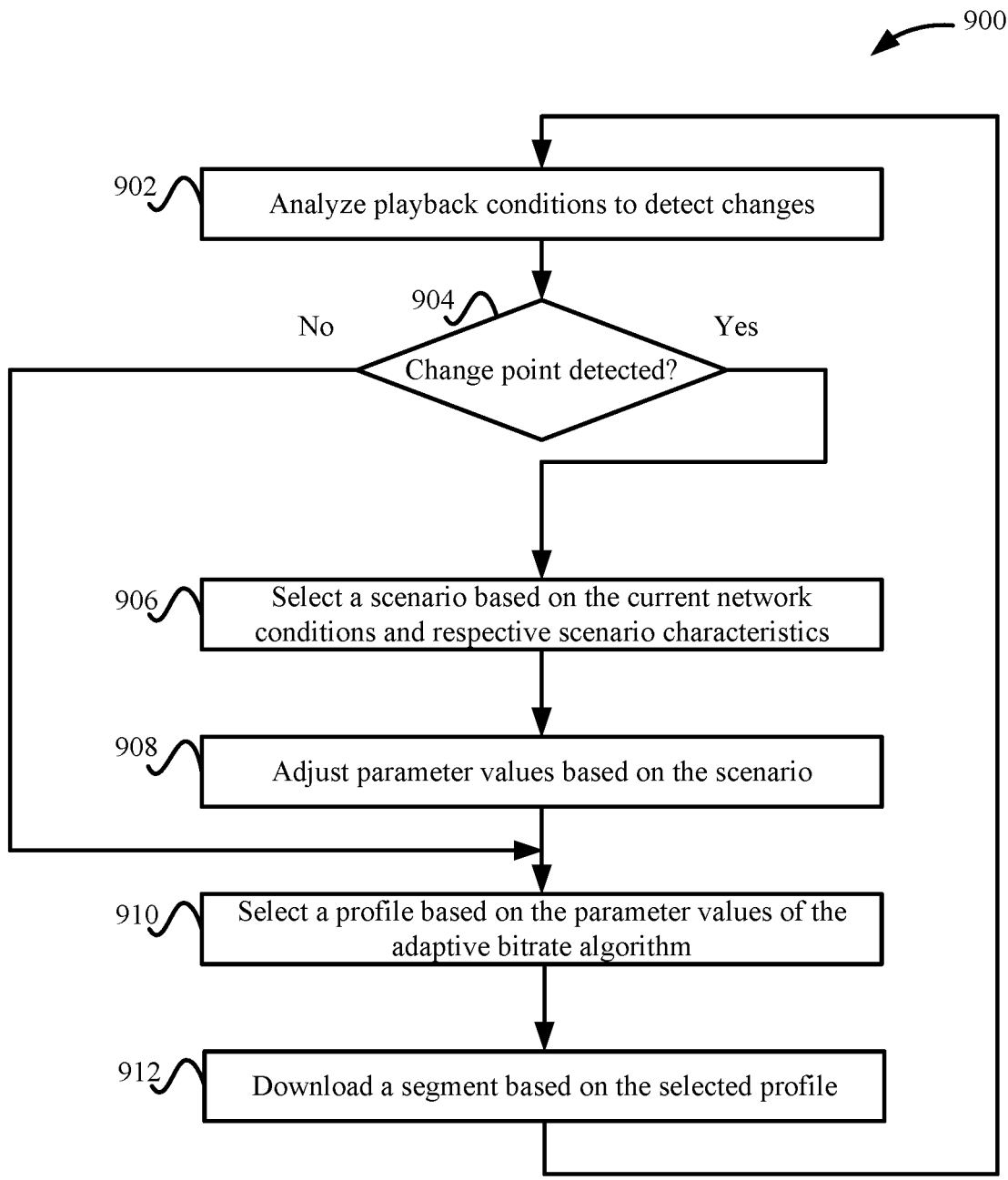
FIG. 9 depicts a simplified flowchart of a method for adjusting the parameters for the adaptive bitrate algorithm according to some embodiments.

FIG. 9 depicts a simplified flowchart 900 of a method for adjusting the parameters for adaptive bitrate algorithm 110 according to some embodiments. At 902, change point detection 802 analyzes playback conditions of the current playback session to detect changes. At 904, it is determined if a change point is detected. If a change point is detected, at 906, in-session scenario selector 114 selects a scenario based on the playback conditions and respective scenario characteristics. The playback conditions may be mapped to the scenario characteristics and the scenario that meets (e.g., is closest) to the playback conditions may be selected. At 908, adaptive bitrate algorithm 110 adjusts the parameter values based on the scenario.

If no change point is detected, a profile may be selected based on the existing parameters of adaptive bitrate algorithm 110. However, if parameter values were changed, at 910, adaptive bitrate algorithm 110 selects a profile based on the adjusted parameters. Then, at 912, segment downloader 812 downloads a segment based on the selected profile. The process then reiterates to 902 where change points are detected again.

Example

Figure 10:
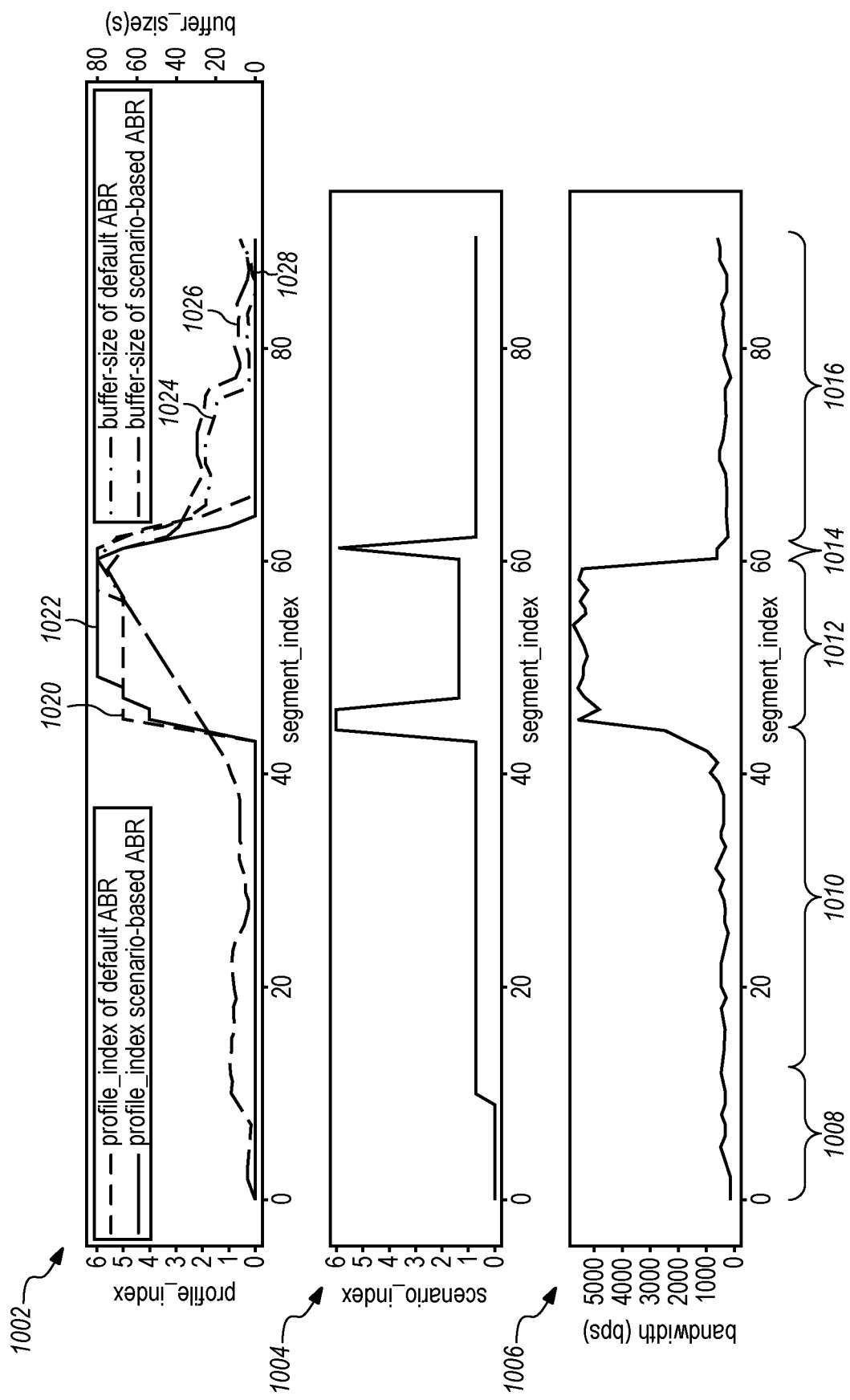
FIG. 10 depicts an example of adjusting parameters for scenarios and a selection of profiles according to some embodiments.

The following will describe an example that shows the adjusting of parameters based on scenarios. FIG. 10 depicts an example of adjusting parameters for scenarios and a selection of profiles according to some embodiments. FIG. 10 includes a graph 1002 that shows the profiles that are selected, a graph 1004 that shows the scenarios that are selected, and a graph 1006 that shows the bandwidth experienced. Graph 1002 may include the profile index on the Y axis and the segment index on the X axis. Additionally, the buffer size is shown on the Y axis. Graph 1002 may include four lines. A line 1020 shows the profile index for the default adaptive bitrate algorithm, and a line 1022 shows a profile index for the scenario-based adaptive bitrate algorithm 110. Also, a line 1024 shows the buffer size of the default adaptive bitrate, and a line 1026 shows the buffer size of the scenario-based adaptive bitrate algorithm 110. A default adaptive bitrate algorithm may use a fixed set of parameter values and the scenario-based adaptive bitrate algorithm 110 may adjust parameters based on scenarios. Graph 1004 shows the scenario index on the Y axis and the segment index on the X axis. Graph 1006 shows the bandwidth on the Y axis and the segment index on the X axis.

In some embodiments, a quad-tree scenario partition is used as shown in FIG. 6C. Before each segment is downloaded, a change point analysis is performed to determine whether the playback conditions have changed. The download process may be divided into four stages. For the first ten segments at 1008, the default configuration to determine a profile using adaptive bitrate algorithm 110 may be used and the download bandwidth is recorded for these segments. After the first ten segments are downloaded, a scenario may be selected. It is noted that the first ten segments may be used to establish some data to use, but using the default parameters for the first ten segments may not needed. For example, a scenario may be selected initially in the beginning of playback and parameters for the scenario are used.

In a second stage at 1010, in-session scenario selector 114 selects scenario S1. Scenario S1 may represent playback conditions of low bandwidth, low fluctuation, and a low rebuffer ratio. For example, the bandwidth of the first 10 segments may have been low as shown in graph 1006. Also, there may have been a small variation in bandwidth and a small number of rebuffers. The rebuffers that occur may be based on the buffer length, such as when buffer length goes below a threshold.

After downloading the 44$^{th}$ segment, a change point is detected where the playback conditions, such as bandwidth, change enough to meet a change point threshold. At this point, the bandwidth may change from about 500 bps to more than 5000 bps. In-session scenario selector 114 may select a new scenario at this point. For example, the playback conditions may be that bandwidth is fluctuating a large amount due to the change in bandwidth and bandwidth is lower. A scenario that may best match these playback conditions may be scenario S9 in FIG. 6C. Scenario S9 is a low bandwidth, high fluctuation, and high rebuffer area. In this case, a more conservative decision on selecting a profile may be performed due to the high fluctuation and high rebuffer occurrences. For example, one adjusted parameter may be to use a smaller bandwidth safe factor to estimate bandwidth, which may select a lower profile than default adaptive bitrate algorithm typically does.

In a third stage at 1012 from segments 44 to 60, the bandwidth is high and relatively stable. In this case, a change point may be detected in that the bandwidth is now stable and a scenario is selected that is more associated with a stable bandwidth. This may be a scenario S2 in FIG. 6C, which has a lower standard deviation of bandwidth than scenario S9, which means the scenario is more suited for playback conditions of stable bandwidth. In this case, scenario S2 is used to select profiles. Scenario S2 is associated with high bandwidth, low fluctuation, and low rebuffer occurrences, and a more aggressive decision may be made by adaptive bitrate algorithm 110.

In a fourth stage at 1014, from segments 60 to 62 bandwidth may drop dramatically, resulting in a change point. In this case, the scenario with a higher fluctuating bandwidth may be selected, such as scenario S9. This results in changing from scenario S2 to S9 in graph 1004. Then, in a fifth stage at 1016 after segment 62, bandwidth becomes stable again and it is a lower bandwidth. In this case, the scenario is changed to scenario S1 again, which represents a scenario with low bandwidth and low fluctuation. This results in a more conservative decision for adaptive bitrate algorithm 110.

In graph 1002, the profiles that are selected and the buffer size may be contrasted between the default adaptive bitrate algorithm and the scenario-based adaptive bitrate algorithm 110. During the $49^{th}$ to $60^{th}$ segments, the scenario-based adaptive bitrate algorithm 110 may use a higher profile than the default adaptive bitrate algorithm. This allows the video to be streamed at a higher quality while the bitrate is stable and high. Scenario-based adaptive bitrate algorithm 110 may use a higher profile because the scenario S2 may have more aggressive parameters compared to the standard adaptive bitrate algorithm. Then, scenario-based adaptive bitrate algorithm 110 makes a more conservative decision for profiles after segment 60 compared to the standard adaptive bitrate algorithm. In this case, the lower profiles are requested sooner in the scenario-based adaptive bitrate algorithm 110 compared to the standard adaptive bitrate algorithm. The scenario S9 in the scenario-based adaptive bitrate algorithm 110 may have more conservative parameters than the standard adaptive bitrate algorithm. The more conservative parameters may be good because bandwidth has dropped. This causes the buffer size to be larger when the scenario-based adaptive bitrate algorithm 110 is used compared to the buffer size when the default adaptive bitrate algorithm. The larger buffer size may avoid a rebuffer occurrence. For instance, when the buffer size of the default adaptive bitrate algorithm reaches 0 at 1028, a rebuffer may occur. However, the buffer size of the scenario-based adaptive bitrate algorithm 110 does not reach 0 at 1028, and a rebuffer does not occur. Accordingly, the performance of selecting the profiles using scenario-based adaptive bitrate algorithm 110 may be improved as the profile selection may adjust faster to changing playback conditions and rebuffers may be avoided.

Conclusion

Using scenarios to adjust the parameters of adaptive bitrate algorithm 110 may improve the performance of a playback session. The changing of parameters is different from changing the profiles based on the current playback conditions. In this case, the parameters that are used to determine when to change the profiles are adjusted to optimal parameters based on the current playback conditions. This allows adaptive bitrate algorithm 110 to make an optimal selection for the profile, which may reduce the number of rebuffer occurrences when poor playback conditions are encountered while allowing a higher profile level to be selected when better playback conditions are encountered.

System

Figure 11:
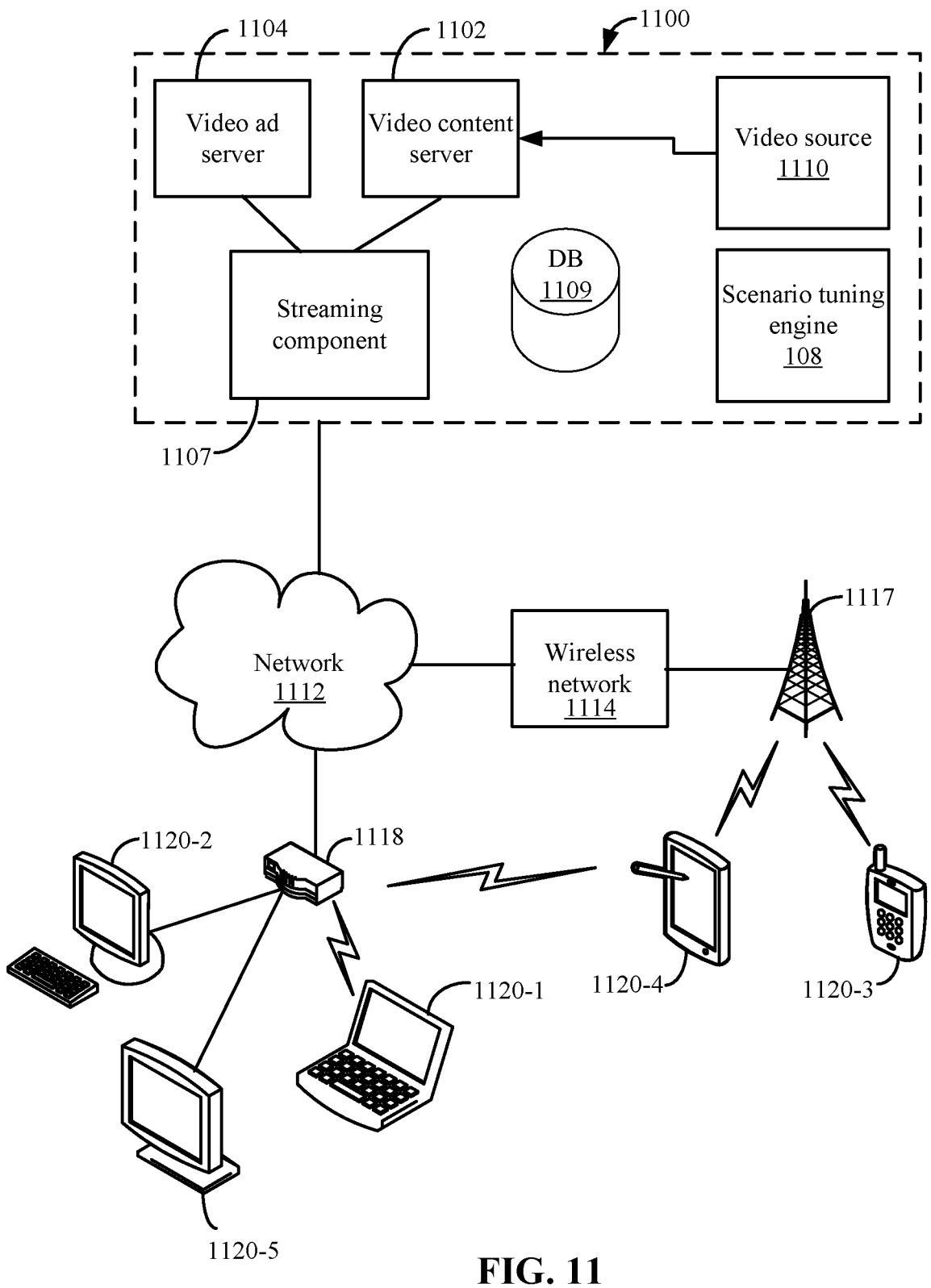
FIG. 11 depicts a video streaming system in communication with multiple client devices via one or more communication networks according to one embodiment.

Features and aspects as disclosed herein may be implemented in conjunction with a video streaming system 1100 in communication with multiple client devices via one or more communication networks as shown in FIG. 11. Aspects of the video streaming system 1100 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 1100, video data may be obtained from one or more sources for example, from a video source 1110, for use as input to a video content server 1102. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 1100 may include one or more computer servers or modules 1102, 1104, and/or 1107 distributed over one or more computers. Each server 1102, 1104, 1107 may include, or may be operatively coupled to, one or more data stores 1109, for example databases, indexes, files, or other data structures. A video content server 1102 may access a data store (not shown) of various video segments. The video content server 1102 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 1104 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 1100, a public service message, or some other information. The video advertising server 1104 may serve the video advertising segments as directed by a user interface controller (not shown).

The video streaming system 1100 also may include scenario tuning engine 108.

The video streaming system 1100 may further include an integration and streaming component 1107 that integrates video content and video advertising into a streaming video segment. For example, streaming component 1107 may be a content server or streaming media server. A controller (not shown) may determine the selection or configuration of advertising in the streaming video based on any suitable algorithm or process. The video streaming system 1100 may include other modules or units not depicted in FIG. 11, for example, administrative servers, commerce servers, network infrastructure, advertising selection engines, and so forth.

The video streaming system 1100 may connect to a data communication network 1112. A data communication network 1112 may comprise a local area network (LAN), a wide area network (WAN), for example, the Internet, a telephone network, a wireless cellular telecommunications network (WCS) 1114, or some combination of these or similar networks.

One or more client devices 1120 may be in communication with the video streaming system 1100, via the data communication network 1112, wireless cellular telecommunications network 1114, and/or another network. Such client devices may include, for example, one or more laptop computers 1120-1, desktop computers 1120-2, "smart" mobile phones 1120-3, tablet devices 1120-4, network-enabled televisions 1120-5, or combinations thereof, via a router 1118 for a LAN, via a base station 1117 for a wireless cellular telecommunications network 1114, or via some other connection. In operation, such client devices 1120 may send and receive data or instructions to the system 1100, in response to user input received from user input devices or other input. In response, the system 1100 may serve video segments and metadata from the data store 1109 responsive to selection of media programs to the client devices 1120. Client devices 1120 may output the video content from the streaming video segment in a media player using a display screen, projector, or other video output device, and receive user input for interacting with the video content.

Distribution of audio-video data may be implemented from streaming component 1107 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth, and structure of those files, delivers just the amount of data necessary to play the video, at the rate needed to play it. Streaming media servers may also account for the transmission bandwidth and capabilities of the media player on the destination client. Streaming component 1107 may communicate with client device 1120 using control messages and data messages to adjust to changing playback conditions as the video is played. These control messages can include commands for enabling control functions such as fast forward, fast reverse, pausing, or seeking to a particular part of the file at the client.

Since streaming component 1107 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 1107 may use TCP-based protocols, such as HyperText Transfer Protocol (HTTP) and Real Time Messaging Protocol (RTMP). Streaming component 1107 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 12:
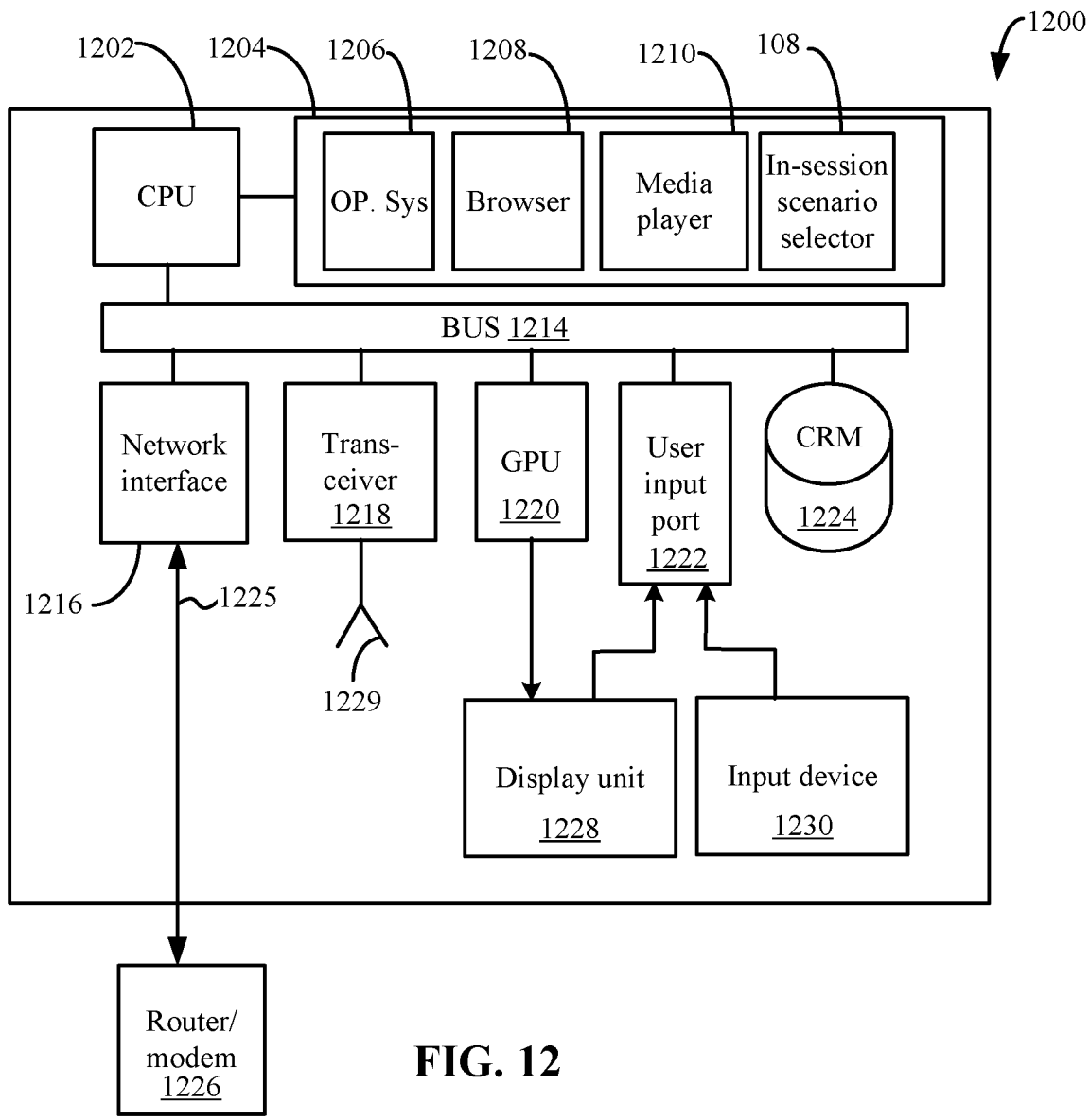
FIG. 12 depicts a diagrammatic view of an apparatus for viewing video content and advertisements.

Referring to FIG. 12, a diagrammatic view of an apparatus 1200 for viewing video content and advertisements is illustrated. In selected embodiments, the apparatus 1200 may include a processor (CPU) 1202 operatively coupled to a processor memory 1204, which holds binary-coded functional modules for execution by the processor 1202. Such functional modules may include an operating system 1206 for handling system functions such as input/output and memory access, a browser 1208 to display web pages, and media player 1210 for playing video. The modules may further include in-session scenario selector 114. The memory 1204 may hold additional modules not shown in FIG. 12, for example modules for performing other operations described elsewhere herein.

A bus 1214 or other communication component may support communication of information within the apparatus 1200. The processor 1202 may be a specialized or dedicated microprocessor configured or operable to perform particular tasks in accordance with the features and aspects disclosed herein by executing machine-readable software code defining the particular tasks. Processor memory 1204 (e.g., random access memory (RAM) or other dynamic storage device) may be connected to the bus 1214 or directly to the processor 1202, and store information and instructions to be executed by a processor 1202. The memory 1204 may also store temporary variables or other intermediate information during execution of such instructions.

A computer-readable medium in a storage device 1224 may be connected to the bus 1214 and store static information and instructions for the processor 1202; for example, the storage device (CRM) 1224 may store the modules 1206, 1208, 1210 and 1212 when the apparatus 1200 is powered off, from which the modules may be loaded into the processor memory 1204 when the apparatus 1200 is powered up. The storage device 1224 may include a non-transitory computer-readable storage medium holding information, instructions, or some combination thereof, for example instructions that when executed by the processor 1202, cause the apparatus 1200 to be configured or operable to perform one or more operations of a method as described herein.

A communication interface 1216 may also be connected to the bus 1214. The communication interface 1216 may provide or support two-way data communication between the apparatus 1200 and one or more external devices, e.g., the streaming system 1100, optionally via a router/modem 1226 and a wired or wireless connection. In the alternative, or in addition, the apparatus 1200 may include a transceiver 1218 connected to an antenna 1229, through which the apparatus 1200 may communicate wirelessly with a base station for a wireless communication system or with the router/modem 1226. In the alternative, the apparatus 1200 may communicate with a video streaming system 1100 via a local area network, virtual private network, or other network. In another alternative, the apparatus 1200 may be incorporated as a module or component of the system 1100 and communicate with other components via the bus 1214 or by some other modality.

The apparatus 1200 may be connected (e.g., via the bus 1214 and graphics processing unit 1220) to a display unit 1228. A display 1228 may include any suitable configuration for displaying information to an operator of the apparatus 1200. For example, a display 1228 may include or utilize a liquid crystal display (LCD), touchscreen LCD (e.g., capacitive display), light emitting diode (LED) display, projector, or other display device to present information to a user of the apparatus 1200 in a visual display.

One or more input devices 1230 (e.g., an alphanumeric keyboard, microphone, keypad, remote controller, game controller, camera, or camera array) may be connected to the bus 1214 via a user input port 1222 to communicate information and commands to the apparatus 1200. In selected embodiments, an input device 1230 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1228, for example using a touch sensitive screen. A cursor control device may communicate direction information and command selections to the processor 1202 and control cursor movement on the display 1228. A cursor control device may have two or more degrees of freedom, for example allowing the device to specify cursor positions in a plane or three-dimensional space.

Example Embodiments

In some embodiments, a method comprising: during playback of a video, using, by a computing device, a parameter value of an adaptive bitrate algorithm to analyze playback of the video, wherein the adaptive bitrate algorithm uses the parameter value to select a profile from a plurality of profiles to use to request segments of the video; selecting, by the computing device, a scenario in a plurality of scenarios when a playback condition meets a characteristic value of the scenario, wherein the plurality of scenarios are associated with a different characteristic value; adjusting, by the computing device, the parameter value of the adaptive bitrate algorithm based on the scenario to generate an adjusted parameter value, wherein the plurality of scenarios have at least one different parameter value; and using, by the computing device, the adjusted parameter value of the adaptive bitrate algorithm to analyze the playback of the video.

In some embodiments, the method further comprising: determining when a change point occurs based on analyzing the playback of the video, wherein the change point is used to determine when to select a scenario.

In some embodiments, the change point indicates that a change in the playback condition has occurred.

In some embodiments, selecting the scenario comprises: comparing the characteristic value of each scenario to the playback condition; and selecting the scenario with the characteristic value that is determined to meet the playback condition.

In some embodiments, adjusting the parameter value comprises changing the parameter value from a first value for a first scenario to a second value for a second scenario.

In some embodiments, using the adjusted parameter value comprises: selecting a new profile to use to playback the video from a current profile using the adjusted parameter value.

In some embodiments, the method further comprising: receiving the characteristic value for each of the plurality of scenarios, wherein the characteristic value is determined by analyzing historical playback conditions to partition the playback condition into different partitions that are associated with different characteristic values.

In some embodiments, the historical playback conditions are partitioned by analyzing a plurality of partition pattern rules to determine a partition pattern rule that fits the historical playback conditions.

In some embodiments, the respective characteristic value for each of the plurality of scenarios is selected based on the partition of the scenario and the playback condition in the partition.

In some embodiments, the method further comprising: receiving a respective parameter value for each of the plurality of scenarios.

In some embodiments, the respective parameter value for each of the plurality of scenarios is based on an analysis of a respective playback condition that is associated with each respective scenario.

In some embodiments, the respective parameter value is selected based on an analysis of the playback condition and a performance of the adaptive bitrate algorithm using the respective parameter value.

In some embodiments, a non-transitory computer-readable storage medium containing instructions, that when executed, control a computer system to be operable for: during playback of a video, using a parameter value of an adaptive bitrate algorithm to analyze playback of the video, wherein the adaptive bitrate algorithm uses the parameter value to select a profile from a plurality of profiles to use to request segments of the video; selecting a scenario in a plurality of scenarios when a playback condition meets a characteristic value of the scenario, wherein the plurality of scenarios are associated with a different characteristic value; adjusting the parameter value of the adaptive bitrate algorithm based on the scenario to generate an adjusted parameter value, wherein the plurality of scenarios have at least one different parameter value; and using the adjusted parameter value of the adaptive bitrate algorithm to analyze the playback of the video.

In some embodiments, a method comprising: receiving, by a computing device, a playback condition for playing one or more videos; analyzing, by the computing device, the playback condition to determine a plurality of scenarios, wherein the plurality of scenarios are associated with a different characteristic value from the playback condition; analyzing, by the computing device, the characteristic value for each scenario in the plurality of scenarios to select a parameter value for an adaptive bitrate algorithm, wherein the adaptive bitrate algorithm uses the parameter value to select a profile in a plurality of profiles; and providing, by the computing device, the characteristic value and the parameter value for the plurality of scenarios to a client device for use by the adaptive bitrate algorithm when playing back a video.

In some embodiments, analyzing the playback condition to determine the plurality of scenarios comprises: analyzing the playback condition to partition the playback condition into different characteristic values.

In some embodiments, analyzing the playback condition to determine the plurality of scenarios comprises: analyzing a plurality of partition pattern rules to determine a partition pattern rule that partitions the playback condition.

In some embodiments, the respective characteristic value for the plurality of scenarios is selected based on the partition of the scenario and the playback condition in the partition.

In some embodiments, analyzing the characteristic value for each scenario in the plurality of scenarios to select the parameter value comprises: analyzing the respective playback condition that is associated with each respective scenario to select the parameter value for each scenario.

In some embodiments, analyzing the characteristic value for each scenario in the plurality of scenarios to select the parameter value comprises: selecting the respective parameter value based on an analysis of the playback condition and a performance of the adaptive bitrate algorithm using the respective parameter value.

In some embodiments, the method further comprising: analyzing the playback condition to determine when a change point occurs based on analyzing the playback condition, wherein the change point is used to determine when to select a scenario.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
during playback of a video, using, by a computing device, a parameter value of an adaptive bitrate algorithm to analyze playback of the video, wherein the adaptive bitrate algorithm uses the parameter value to select a profile from a plurality of profiles to use to request segments of the video;
selecting, by the computing device, a scenario in a plurality of scenarios when a first playback condition meets a characteristic value of the scenario, wherein the plurality of scenarios are associated with a different characteristic value, wherein the characteristic value is determined by analyzing second playback conditions to partition the second playback conditions into different partitions that are associated with different characteristic values;
adjusting, by the computing device, the parameter value of the adaptive bitrate algorithm based on the scenario to generate an adjusted parameter value, wherein the plurality of scenarios have at least one different parameter value; and
using, by the computing device, the adjusted parameter value of the adaptive bitrate algorithm to analyze the playback of the video.

2. The method of claim 1, further comprising:
determining when a change point occurs based on analyzing the playback of the video, wherein the change point is used to determine when to select a scenario.

3. The method of claim 2, wherein the change point indicates that a change in the first playback condition has occurred.

4. The method of claim 1, wherein selecting the scenario comprises:
comparing the characteristic value of each scenario to the first playback condition; and
selecting the scenario with the characteristic value that is determined to meet the first playback condition.

5. The method of claim 1, wherein adjusting the parameter value comprises changing the parameter value from a first value for a first scenario to a second value for a second scenario.

6. The method of claim 1, wherein using the adjusted parameter value comprises:
selecting a new profile to use to playback the video from a current profile using the adjusted parameter value.

7. The method of claim 1, further comprising:
receiving the characteristic value for each of the plurality of scenarios.

8. The method of claim 7, wherein the second playback conditions are partitioned by analyzing a plurality of partition pattern rules to determine a partition pattern rule that fits the second playback conditions.

9. The method of claim 7, wherein the respective characteristic value for each of the plurality of scenarios is selected based on the partition of the scenario and the playback condition in the partition.

10. The method of claim 1, further comprising:
receiving a respective parameter value for each of the plurality of scenarios.

11. The method of claim 1, wherein the respective parameter value for each of the plurality of scenarios is based on an analysis of a respective second playback condition that is associated with each respective scenario.

12. The method of claim 11, wherein the respective parameter value is selected based on an analysis of the second playback condition and a performance of the adaptive bitrate algorithm using the respective parameter value.

13. A non-transitory computer-readable storage medium containing instructions, that when executed, control a computer system to be operable for:
during playback of a video, using a parameter value of an adaptive bitrate algorithm to analyze playback of the video, wherein the adaptive bitrate algorithm uses the parameter value to select a profile from a plurality of profiles to use to request segments of the video;
selecting a scenario in a plurality of scenarios when a first playback condition meets a characteristic value of the scenario, wherein the plurality of scenarios are associated with a different characteristic value, wherein the characteristic value is determined by analyzing second playback conditions to partition the second playback conditions into different partitions that are associated with different characteristic values;
adjusting the parameter value of the adaptive bitrate algorithm based on the scenario to generate an adjusted parameter value, wherein the plurality of scenarios have at least one different parameter value; and
using the adjusted parameter value of the adaptive bitrate algorithm to analyze the playback of the video.

14. A method comprising:
receiving, by a computing device, a playback condition for playing one or more videos;
analyzing, by the computing device, the playback condition to partition the playback condition into different partitions to determine a plurality of scenarios, wherein the plurality of scenarios are associated with a different characteristic value from the playback condition;
analyzing, by the computing device, the characteristic value for each scenario in the plurality of scenarios to select a parameter value for an adaptive bitrate algorithm, wherein the adaptive bitrate algorithm uses the parameter value to select a profile in a plurality of profiles; and
providing, by the computing device, the characteristic value and the parameter value for the plurality of scenarios to a client device for use by the adaptive bitrate algorithm when playing back a video.

15. The method of claim 14, wherein analyzing the playback condition to determine the plurality of scenarios comprises:
analyzing the playback condition to partition the playback condition into the different partitions that are associated with different characteristic values.

16. The method of claim 15, wherein analyzing the playback condition to determine the plurality of scenarios comprises:
analyzing a plurality of partition pattern rules to determine a partition pattern rule that partitions the playback condition into the different partitions.

17. The method of claim 15, wherein the respective characteristic value for the plurality of scenarios is selected based on the partition of the scenario and the playback condition in the partition.

18. The method of claim 14, wherein analyzing the characteristic value for each scenario in the plurality of scenarios to select the parameter value comprises:
analyzing the respective playback condition that is associated with each respective scenario to select the parameter value for each scenario.

19. The method of claim 14, wherein analyzing the characteristic value for each scenario in the plurality of scenarios to select the parameter value comprises:
selecting the respective parameter value based on an analysis of the playback condition and a performance of the adaptive bitrate algorithm using the respective parameter value.

20. The method of claim 14, further comprising:
analyzing the playback condition to determine when a change point occurs based on analyzing the playback condition, wherein the change point is used to determine when to select a scenario.

* * * * *